(12) United States Patent
Chen et al.

(10) Patent No.: US 12,216,364 B2
(45) Date of Patent: Feb. 4, 2025

(54) DISPLAY SUBSTRATE, MANUFACTURING METHOD THEREOF AND DISPLAY APPARATUS

(71) Applicants: Wuhan BOE Optoelectronics Technology Co., Ltd., Hubei (CN); BOE Technology Group Co., Ltd., Beijing (CN)

(72) Inventors: Qi Chen, Beijing (CN); Yujie Gao, Beijing (CN); Wei Wu, Beijing (CN); Hao Zhang, Beijing (CN); Yuan Tong, Beijing (CN); Yichen Zhou, Beijing (CN); Dang Zhang, Beijing (CN); Yiyi Zhang, Beijing (CN); Xiang Liu, Beijing (CN); Taohe Zhu, Beijing (CN); Junfeng Dai, Beijing (CN); Jinli Li, Beijing (CN); Bo Huang, Beijing (CN)

(73) Assignees: Wuhan BOE Optoelectronics Technology Co., Ltd., Hubei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/042,522

(22) PCT Filed: Jun. 29, 2022

(86) PCT No.: PCT/CN2022/102459
§ 371 (c)(1),
(2) Date: Feb. 22, 2023

(87) PCT Pub. No.: WO2024/000301
PCT Pub. Date: Jan. 4, 2024

(65) Prior Publication Data
US 2024/0272493 A1 Aug. 15, 2024

(51) Int. Cl.
*G02F 1/1343* (2006.01)
*G02F 1/1337* (2006.01)

(52) U.S. Cl.
CPC .... *G02F 1/134336* (2013.01); *G02F 1/13378* (2013.01); *G02F 1/13439* (2013.01)

(58) Field of Classification Search
CPC .......... G02F 1/134336; G02F 1/13378; G02F 1/13439
See application file for complete search history.

(56) References Cited

U.S. PATENT DOCUMENTS

2002/0154079 A1 10/2002 Shiota et al.
2006/0044503 A1 3/2006 Ham et al.
(Continued)

FOREIGN PATENT DOCUMENTS

CN 1743931 A 3/2006
CN 1956224 A 5/2007
(Continued)

*Primary Examiner* — Lucy P Chien
(74) *Attorney, Agent, or Firm* — Workman Nydegger

(57) ABSTRACT

The present disclosure provides a display substrate, a manufacturing method of the display substrate and a display apparatus. The display substrate includes a base substrate; an alignment layer, on the base substrate; a first electrode, located between the base substrate and the alignment layer and being in contact with the alignment layer; and a pattern layer, located between the base substrate and the alignment layer and being in contact with the alignment layer. An orthographic projection of the pattern layer on the base substrate does not overlap an orthographic projection of the first electrode on the base substrate, and a ratio of a contact angle of the pattern layer to a contact angle of the first electrode is greater than or equal to 7/12 and less than 3/2.

17 Claims, 30 Drawing Sheets

(56) References Cited

U.S. PATENT DOCUMENTS

| | | |
|---|---|---|
| 2007/0096100 A1 | 5/2007 | Lee et al. |
| 2011/0194062 A1 | 8/2011 | Lee |
| 2015/0062515 A1 | 3/2015 | Tomioka et al. |
| 2016/0041441 A1 | 2/2016 | Park et al. |
| 2016/0195743 A1 | 7/2016 | Kim et al. |
| 2017/0123254 A1 | 5/2017 | Seo et al. |
| 2021/0063829 A1 | 3/2021 | Li et al. |

FOREIGN PATENT DOCUMENTS

| | | |
|---|---|---|
| CN | 1991537 A | 7/2007 |
| CN | 107145014 A | 9/2017 |
| CN | 107656407 A | 2/2018 |
| CN | 215769283 U | 2/2022 |
| TW | 562984 B | 11/2003 |

DISPLAY SUBSTRATE, MANUFACTURING METHOD THEREOF AND DISPLAY APPARATUS

CROSS-REFERENCE OF RELATED APPLICATIONS

The present application is a national phase entry under 35 U.S.C. § 371 of International Application No. PCT/CN2022/102459 filed on Jun. 29, 2022, the entire content of which is hereby incorporated by reference.

FIELD

The present disclosure relates to the technical field of display, in particular to a display substrate, a manufacturing method thereof, and a display apparatus.

BACKGROUND

Liquid crystal displays (LCDs) have the advantages of light weight, less power consumption, high image quality, low radiation and portability, have gradually replaced traditional cathode ray tube displays (CRT), and are widely applied to modern information devices, such as virtual reality (VR) head-mounted display devices, laptops, televisions, mobile phones and digital products.

SUMMARY

Embodiments of the present disclosure provide a display substrate, a manufacturing method thereof, and a display apparatus. A specific solution is as follows.

In one aspect, embodiments of the present disclosure provide a display substrate, including:
  a base substrate;
  an alignment layer, located on the base substrate;
  a first electrode, located between the base substrate and the alignment layer and being in contact with the alignment layer; and
  a pattern layer, located between the base substrate and the alignment layer and being in contact with the alignment layer.

An orthographic projection of the pattern layer on the base substrate does not overlap an orthographic projection of the first electrode on the base substrate, and a ratio of a contact angle of the pattern layer to a contact angle of the first electrode is greater than or equal to 7/12 and less than 3/2.

In some embodiments, in the above display substrate provided by the embodiments of the present disclosure, the pattern layer and the first electrode are arranged in the same layer and made of the same material.

In some embodiments, in the above display substrate provided by the embodiments of the present disclosure, there are a plurality of first electrodes, and the plurality of first electrodes are arranged in an array on the base substrate.

The orthographic projection of the pattern layer on the base substrate is located in an orthographic projection of a row gap of the first electrodes on the base substrate.

In some embodiments, in the above display substrate provided by the embodiments of the present disclosure, the first electrode includes a first strip electrode and a second strip electrode which are integrally arranged. An extension direction of the first strip electrode is intersected with a row direction, a column direction and an extension direction of the second strip electrode. The extension direction of the second strip electrode is intersected with the row direction and the column direction.

The pattern layer extends in the extension direction of the first strip electrode and/or the extension direction of the second strip electrode.

In some embodiments. in the above display substrate provided by the embodiments of the present disclosure, the extension directions of the pattern layer are different at two adjacent row gaps.

In some embodiments, in the above display substrate provided by the embodiments of the present disclosure, a line width of the pattern layer is the same as a line width of the first strip electrode or the second strip electrode which extends in the same direction as the pattern layer, and a line distance of the pattern layer is the same as a line distance of the first strip electrode or the second strip electrode which extends in the same direction as the pattern layer.

In some embodiments, in the above display substrate provided by the embodiments of the present disclosure. the pattern layer includes a plurality of block patterns arranged at intervals at the same row gap of the first electrodes, and the block pattern extends in the row direction.

In some embodiments, the above display substrate provided by the embodiments of the present disclosure further includes a first signal line. An orthographic projection of the first signal line on the base substrate is located in an orthographic projection of a column gap of the first electrodes on the base substrate.

The orthographic projection of the pattern layer on the base substrate does not overlap the orthographic projection of the first signal line on the base substrate.

In some embodiments, the above display substrate provided by the embodiments of the present disclosure further includes a transistor. At least part of the first signal lines is electrically connected with the transistor.

The orthographic projection of the pattern layer on the base substrate does not overlap an orthographic projection of the transistor on the base substrate.

In some embodiments, in the above display substrate provided by the embodiments of the present disclosure, the pattern layer includes strip patterns extending in the row direction at the row gap of the first electrodes, and a length of each strip pattern in the row direction is the same as a length of the row gap of the first electrodes.

In some embodiments, the above display substrate provided by the embodiments of the present disclosure further includes a second signal line. An orthographic projection of the second signal line on the base substrate is located in an orthographic projection of the row gap of the first electrodes on the base substrate.

The orthographic projection of the pattern layer on the base substrate is located in the orthographic projection of the second signal line on the base substrate.

In some embodiments, in the above display substrate provided by the embodiments of the present disclosure, a ratio of a width of the pattern layer in the column direction to a width of the second signal line in the column direction is greater than or equal to 3/5 and less than 1.

In some embodiments, the above display substrate provided by the embodiments of the present disclosure further includes a second signal line. The orthographic projection of the second signal line on the base substrate is located in the orthographic projection of the row gap of the first electrodes on the base substrate. Two signal lines are correspondingly arranged at the same row gap of the first electrodes.

At the same row gap of the first electrodes, orthographic projections of the two second signal lines on the base substrate are located in the orthographic projection of the pattern layer on the base substrate.

In some embodiments, the above display substrate provided by the embodiments of the present disclosure further includes a first signal line and a second signal line which are intersected and mutually insulated. An orthographic projection of the first signal line on the base substrate is located in an orthographic projection of the column gap of the first electrodes on the base substrate. The first signal line includes an island structure at an intersected position of the column gap of the first electrodes and a gap of the two second signal lines.

The orthographic projection of the pattern layer on the base substrate is coincided with an orthographic projection of the island structure on the base substrate.

In some embodiments, the above display substrate provided by the embodiments of the present disclosure further includes a second signal line and a gate. The second signal line and the gate are of an integral structure and the gate protrudes relative to the second signal line.

The pattern layer includes a plurality of first partitions intersected with the row direction and the column direction and a second partition extending in the row direction. An orthographic projection of the first partitions on the base substrate is located in an orthographic projection of the gate on the base substrate, and an orthographic projection of the second partition on the base substrate is located in the orthographic projection of the second signal line on the base substrate.

In some embodiments, the above display substrate provided by the embodiments of the present disclosure further includes a second electrode located between a layer where the first electrode is located and the base substrate. The orthographic projection of the first electrode on the base substrate overlaps with an orthographic projection of the second electrode on the base substrate.

In some embodiments, the above display substrate provided by the embodiments of the present disclosure further includes an insulating layer located between a layer where the first electrode is located and a layer where the second electrode is located. The first electrode shields a part of the insulating layer, and the insulating layer not shielded by the first electrode is reused as the pattern layer.

In some embodiments, in the above display substrate provided by the embodiments of the present disclosure, the alignment layer includes a positioning region for arranging a spacer. An orthographic projection of the positioning region on the base substrate is located in the orthographic projection of the pattern layer on the base substrate.

On the other hand, embodiments of the present disclosure provide a manufacturing method of the above display substrate, including:
  providing a base substrate;
  forming a pattern layer and a first electrode on the base substrate, wherein an orthographic projection of the pattern layer on the base substrate does not overlap an orthographic projection of the first electrode on the base substrate, and a ratio of a contact angle of the pattern layer to a contact angle of the first electrode is greater than or equal to 7/12 and less than or equal to 3/2;
  coating alignment liquid on the pattern layer and a layer where the first electrode is located; and
  curing the alignment liquid to form an alignment layer.

In some embodiments, in the above manufacturing method provided by the embodiments of the present disclosure, the forming the pattern layer and the first electrode on the base substrate includes:
  forming the pattern layer and the first electrode which are arranged in the same layer and made of the same material on the base substrate by adopting the same mask.

In some embodiments, in the above manufacturing method provided by the embodiments of the present disclosure, the forming the pattern layer and the first electrode which are arranged in the same layer and made of the same material on the base substrate by adopting the same mask includes:
  forming a conducting layer and a photoresist layer successively on the base substrate;
  providing a mask, wherein the mask only has a pattern for manufacturing the first electrode;
  skewing the pattern of the mask relative to a region where the first electrode is to be manufactured, so that the pattern of the mask simultaneously overlaps the region where the first electrode is to be manufactured and a region where the pattern layer is to be manufactured;
  exposing, under shielding of the mask, the photoresist layer of the region where the first electrode is to be manufactured and the photoresist layer of the region where the pattern layer is to be manufactured in different time;
  developing the photoresist layer to retain the photoresist layer of the region where the first electrode is to be manufactured and the photoresist layer of the region where the pattern layer is to be manufactured; and
  etching, under shielding of the photoresist layer, the conducting layer to form the pattern layer and the first electrode which are arranged in the same layer, made of the same material and are disconnected.

In some embodiments, in the above manufacturing method provided by the embodiments of the present disclosure, the forming the pattern layer and the first electrode which are arranged in the same layer and made of the same material on the base substrate by adopting the same mask includes:
  forming the conducting layer and the photoresist layer successively on the base substrate;
  providing a mask, wherein the mask has a first pattern for manufacturing the first electrode and a second pattern for manufacturing the pattern layer, and the first pattern and the second pattern are disconnected;
  exposing, under shielding of the mask, the photoresist layer of the region where the first electrode is to be manufactured and the photoresist layer of the region where the pattern layer is to be manufactured simultaneously;
  developing the photoresist layer to retain the photoresist layer of the region where the first electrode is to be manufactured and the photoresist layer of the region where the pattern layer is to be manufactured; and
  etching, under shielding of the photoresist layer, the conducting layer to form the pattern layer and the first electrode which are arranged in the same layer, made of the same material and are disconnected.

In some embodiments, in the above manufacturing method provided by the embodiments of the present disclosure, the forming the pattern layer and the first electrode on the base substrate includes:
  forming the insulating layer which is arranged on the whole surface taking ammonia gas and silane as reaction source gas, wherein a flow ratio of the ammonia gas to the silane is greater than or equal to 2 and less than or equal to 8; and forming the first electrode on the insulating layer in a pixel opening region of the base substrate, wherein the insulating layer outside the pixel opening region is reused as the pattern layer.

On the other hand, embodiments of the present disclosure provide a display apparatus, including the above display substrate provided by the embodiments of the present disclosure.

DETAILED DESCRIPTION OF THE EMBODIMENTS

Figure 1:
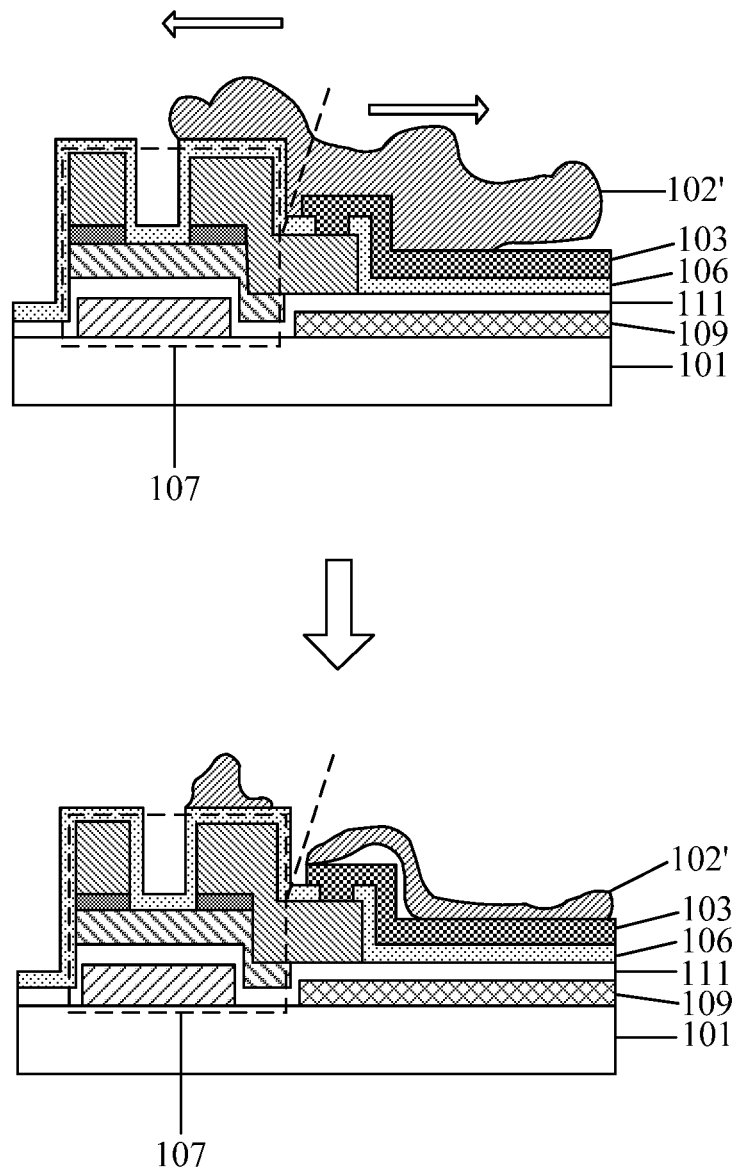
FIG. 1 is a schematic diagram of breakage and accumulation of a wet film formed by alignment liquid in the related art.

In order to make objectives, technical solutions and advantages of the embodiments of the present disclosure clearer, the technical solutions of the embodiments of the present disclosure will be clearly and completely described below with reference to the accompanying drawings of the embodiments of the present disclosure. It should be noted that sizes and shapes of each diagram in the accompanying drawings do not reflect a true scale, and are merely intended to illustrate the contents of the present disclosure. In addition, the same or similar labels throughout indicate the same or similar components or components having the same or similar functions. In order to keep the following descriptions of the present disclosure clear and concise, detailed descriptions of known functions and known components of the present disclosure are omitted.

Unless otherwise defined, technical or scientific terms used herein should have the ordinary meaning as understood by ordinary skill in the art to which the present disclosure belongs. "First", "second" and similar words used in the specification and claims do not represent any order, quantity or importance, and are merely used to distinguish different constituent parts. "Comprise" or "include" and similar words mean that the elements or objects appearing before the word cover the elements or objects recited after the word and their equivalents, but do not exclude other elements or objects. "Inner", "outer", "up", "down" and the like are merely used to represent a relative position relationship, and after an absolute position of a described object is changed, the relative position relationship may also be changed accordingly.

In the product development process, it is discovered that bulk stains is detected on a liquid crystal display under the L127 gray scale for many times. which affects a display effect. Through screen disassembling and parsing, it is discovered that a phenomenon of alignment layer (Polyimide, PI) accumulation exists in a bulk stain occurrence region, and the more serious the bulk stains, the higher the accumulation of the alignment layer.

A manufacturing process of the alignment layer mainly includes two steps. First, through an inkjet device, alignment liquid is dripped on a surface of a display substrate to diffuse to form a wet film 102'. Second, the wet film is heated in a pre-curing device to enable a solvent of the wet film 102' to evaporate to form an alignment layer. In the two steps, contact angles of the display substrate play a crucial role. It is generally recognized that the smaller the interfacial tension between solid and liquid, the smaller the contact angle, the better the degree of wetting of the liquid to the solid, and the more difficult the separation of the liquid and the solid; and the larger the interfacial tension between the solid and the liquid, the larger the contact angle, the worse the degree of wetting of the liquid to the solid, and the easier the separation of the liquid and the solid.

Through further study, it is found that a film layer in contact with the alignment layer below the alignment layer includes a first electrode located at a pixel opening region and an insulating layer located at a non-pixel opening region, such as an insulating layer corresponding to a gate line of a display panel. A contact angle of the first electrode is 60°, and a contact angle of the insulating layer is 20°-30°. It can be seen that the contact angle of the insulating layer is ⅓ to ½ of the contact angle of the first electrode. A contact angle difference of the two is large. The interfacial tension between the alignment liquid and the first electrode is much larger than the interfacial tension between the alignment liquid and the insulating layer, so the first electrode and the insulating layer form "a pulling effect" on the alignment liquid. causing the wet film 102' formed by diffusing the alignment liquid being broken and accumulated, as shown in FIG. 1. In addition, although the smaller contact angle is beneficial to wetting and diffusing the alignment liquid, in the pre-curing process, volatilization rates of the solvent are inconsistent, the alignment liquid is difficult to transfer on an interface with good wettability, breakage, shrinkage and accumulation are prone to being generated, and thus, the alignment layer is poorly accumulated on the insulating layer with the smaller contact angle.

Figure 2:
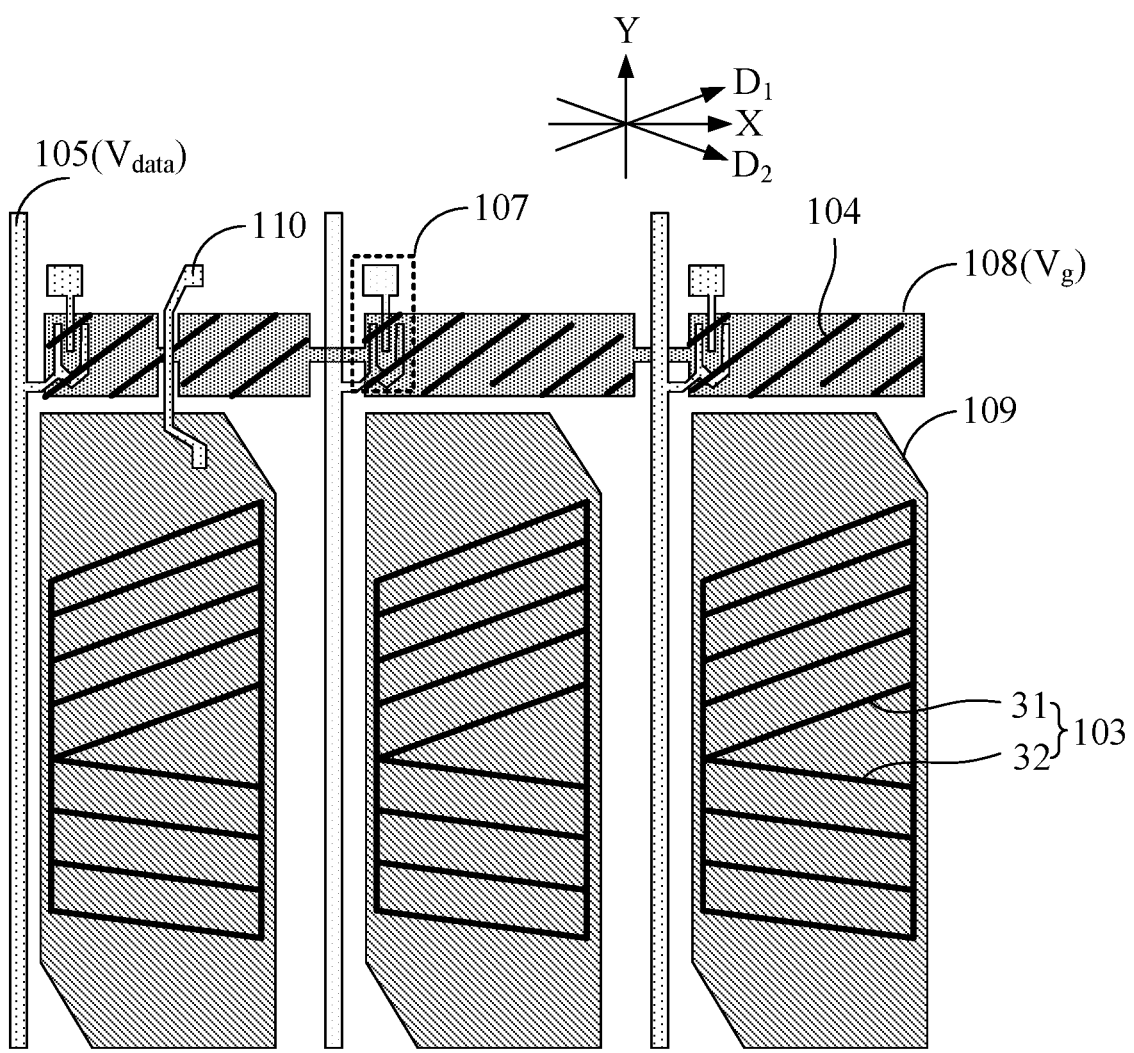
FIG. 2 is a schematic structural diagram of a display substrate provided by an embodiment of the present disclosure.
Figure 3:
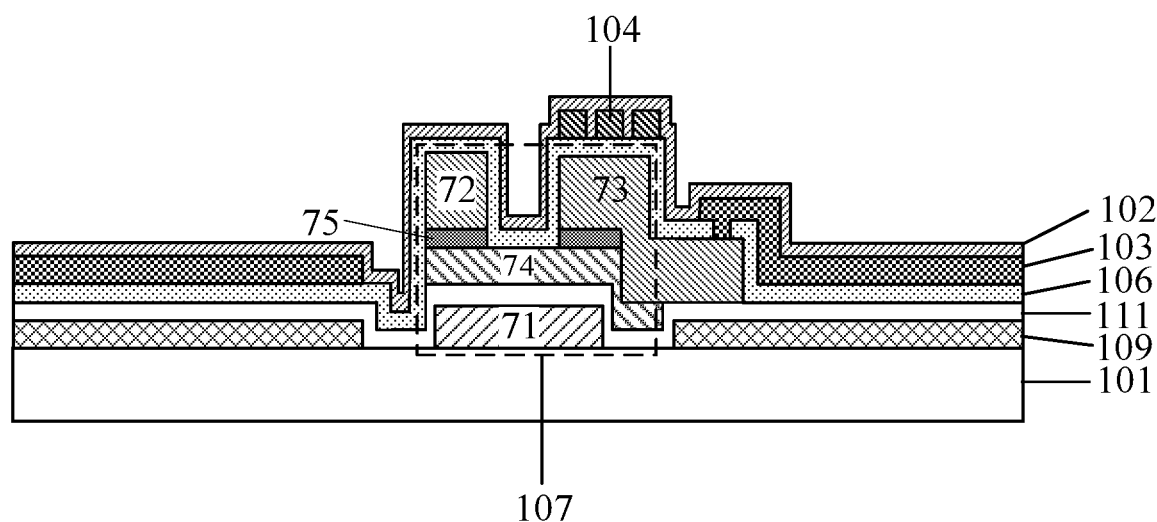
FIG. 3 is another schematic structural diagram of a display substrate provided by an embodiment of the present disclosure.

Based on this, in order to solve the technical problems existing in the related art, embodiments of the present disclosure provide a display substrate, as shown in FIG. 2 and FIG. 3. The display substrate includes:

a base substrate 101;
an alignment layer 102, located on the base substrate 101;
a first electrode 103, located between the base substrate 101 and the alignment layer 102 and being in contact with the alignment layer 102; and
a pattern layer 104, located between the base substrate 101 and the alignment layer 102 and being in contact with the alignment layer 102.

An orthographic projection of the pattern layer 104 on the base substrate 101 does not overlap an orthographic projection of the first electrode 103 on the base substrate 101. A ratio of a contact angle of the pattern layer 104 to a contact angle of the first electrode 103 is greater than or equal to 7/12 and less than 3/2.

In the above display substrate provided by the embodiments of the present disclosure, the pattern layer 104 and the first electrode 103 which are staggered are both in contact with the alignment layer 102, which is equivalent to that the alignment liquid is coated on a surface of the pattern layer 104 and the first electrode 103. According to the present disclosure, a ratio of a contact angle of the pattern layer 104 to a contact angle of the first electrode 103 is greater than or equal to 7/12 and less than 3/2. For example, the contact angle of the first electrode 103 is 60°, and the contact angle of the pattern layer 104 is greater than or equal to 35° and less than 90°, so that a difference between the contact angle of the pattern layer 104 and the contact angle of the first electrode 103 is smaller. Accordingly, a difference between the interfacial tension between the alignment liquid and the first electrode 103 and the interfacial tension between the alignment liquid and the pattern layer 104 is smaller, so that the "pulling effect" of the first electrode 103 and the pattern layer 104 on the alignment liquid is effectively weakened, and the risk of breakage and accumulation of the wet film 102' formed by diffusing of the alignment liquid is reduced. In addition, the contact angle of the insulating layer before improvement is greater than or equal to ⅓ of the contact angle of the first electrode 103 and less than or equal to ½ of the contact angle of the first electrode 103. In the present disclosure, the contact angle of the pattern layer 104 is greater than or equal to 7/12 of the contact angle of the first electrode 103 and less than 3/2 of the contact of the first electrode 103. It can be known from comparison, the contact angle of the pattern layer 104 is greater than the contact angle of the insulating layer before improvement. It can be known from the larger the contact angle, the worse the wettability that the wettability of the alignment liquid on the pattern layer 104 is slightly worse than the wettability of the alignment liquid on the insulating layer before improvement. It can be known in conjunction with the above record "the alignment liquid is difficult to transfer on the interface with good wettability, and breakage, shrinkage and accumulation are prone to being generated" that the alignment liquid is easier to transfer on the pattern layer 104 with worse wettability, and breakage, shrinkage and accumulation are difficult to generate. Based on reasons of the above two aspects, the accumulation phenomenon of the alignment layer 102 may be obviously reduced, and a display effect is improved.

Figure 4:
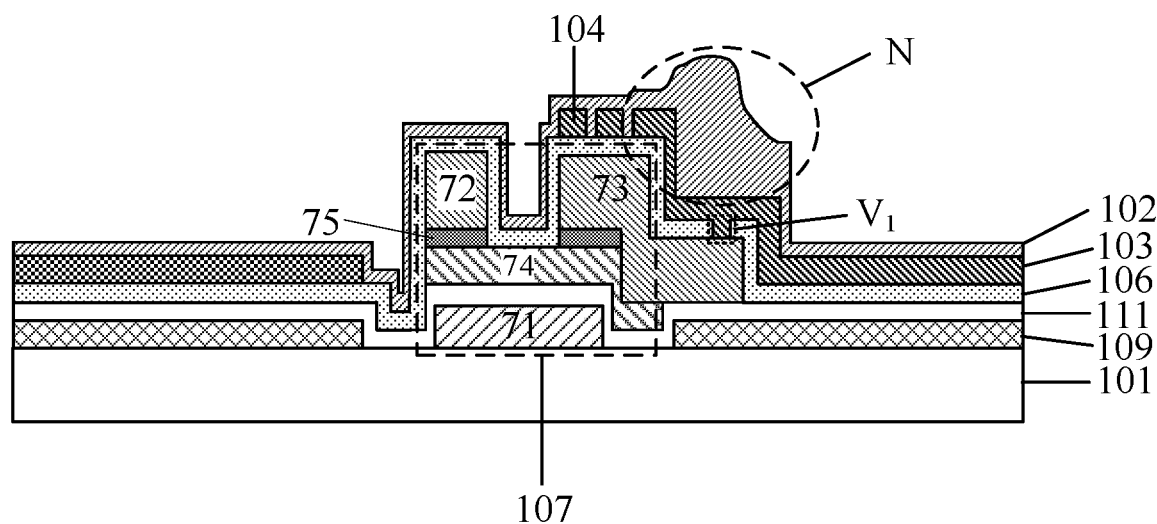
FIG. 4 is a schematic diagram of accumulation of a wet film formed by alignment liquid caused by lap joint of a first electrode and a pattern layer.

In addition, as shown in FIG. 4, if the first electrode 103 is in lap joint with the pattern layer 104, on the one hand, the alignment layer 102 at a lap joint position N will be accumulated higher, and on the other hand, the pattern layer 104 possibly changes interface resistance of the first electrode 103 at a first via hole $V_1$ and affects signal transmission and display image quality. An orthographic projection of the pattern layer 104 on the base substrate 101 does not overlap an orthographic projection of the first electrode 103 on the base substrate 101, so that the pattern layer 104 is disconnected with the first electrode 103, the situation that the pattern layer 104 is in lap joint with the first electrode 103 is avoided, thus, the pattern layer 104 cannot affect signal transmission and the display image quality, and further, the alignment layer 102 is prevented from being accumulated at the lap joint position N.

Figure 5:
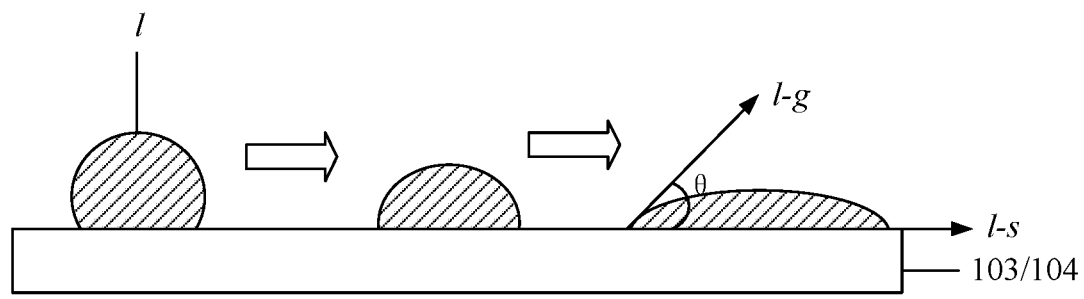
FIG. 5 is a diagram illustrating a process of testing a contact angle provided by an embodiment of the present disclosure.

In some embodiments, the contact angle may be tested through a method as shown in FIG. 5. The test process is that: a hydrophilic liquid drop l (such as deionized water) with a preset volume (such as 1 μL) is dropped on the pattern layer 104 or the first electrode 103, the liquid drop l starts to diffuse on the pattern layer 104 or the first electrode 103, until the liquid drop l does not diffuse and move, the liquid drop l and the pattern layer 104 or the first electrode 103 are photographed, an included angle θ between liquid drop-air interface (l-g) and liquid drop-solid interface (l-s) in the photographed picture is measured, and the included angle θ is the contact angle of the pattern layer 104 or the first electrode 103.

Aiming at "adhesive power" of the alignment layer 102 on the first electrode 103 and the insulating layer before improvement, an adhesion measurement experiment of the alignment layer 102 on the first electrode 103 and the insulating layer is carried out. For example, an eraser is used to wipe the alignment layer 102 with the same force, then the residual condition of the alignment layer 102 is observed under a microscope, and it is found from a result that after wiping, the alignment layer 102 remaining on the first electrode 103 is more complete relative to the alignment layer 102 remaining on the insulating layer, which explains that combination of the alignment layer 102 and the first electrode 103 is closer. In addition, it is found that the surface roughness of the first electrode 103 is small, and the alignment layer 102 does not generate an accumulation phenomenon on the first electrode 103. Thus, as shown in FIG. 3, in the above display substrate provided by the embodiments of the present disclosure, the pattern layer 104 and the first electrode 103 may be arranged at the same layer and made of the same material, so that the alignment layer 102 and the pattern layer 104 may be combined closely, and it may be ensured that the alignment layer 102 is not accumulated on the pattern layer 104.

Figure 6:
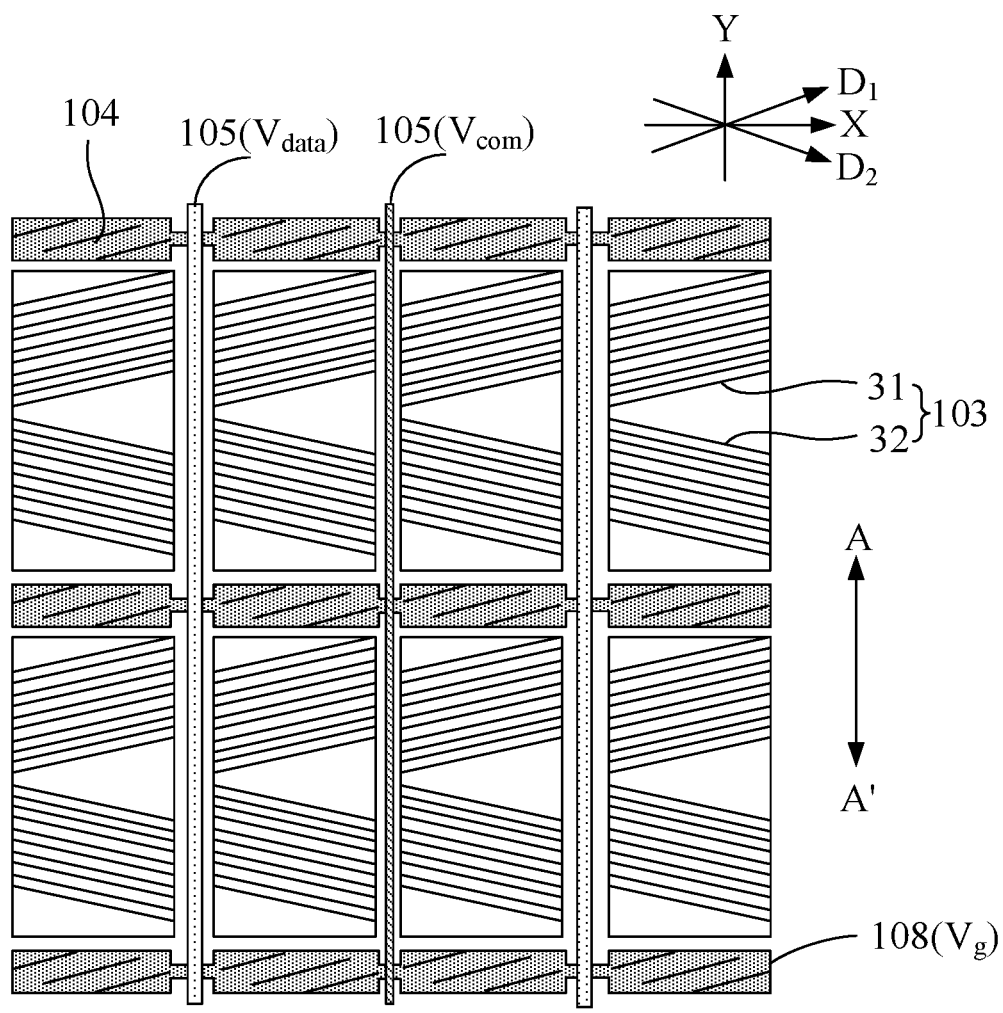
FIG. 6 is another schematic structural diagram of a display substrate provided by an embodiment of the present disclosure.
Figure 7:
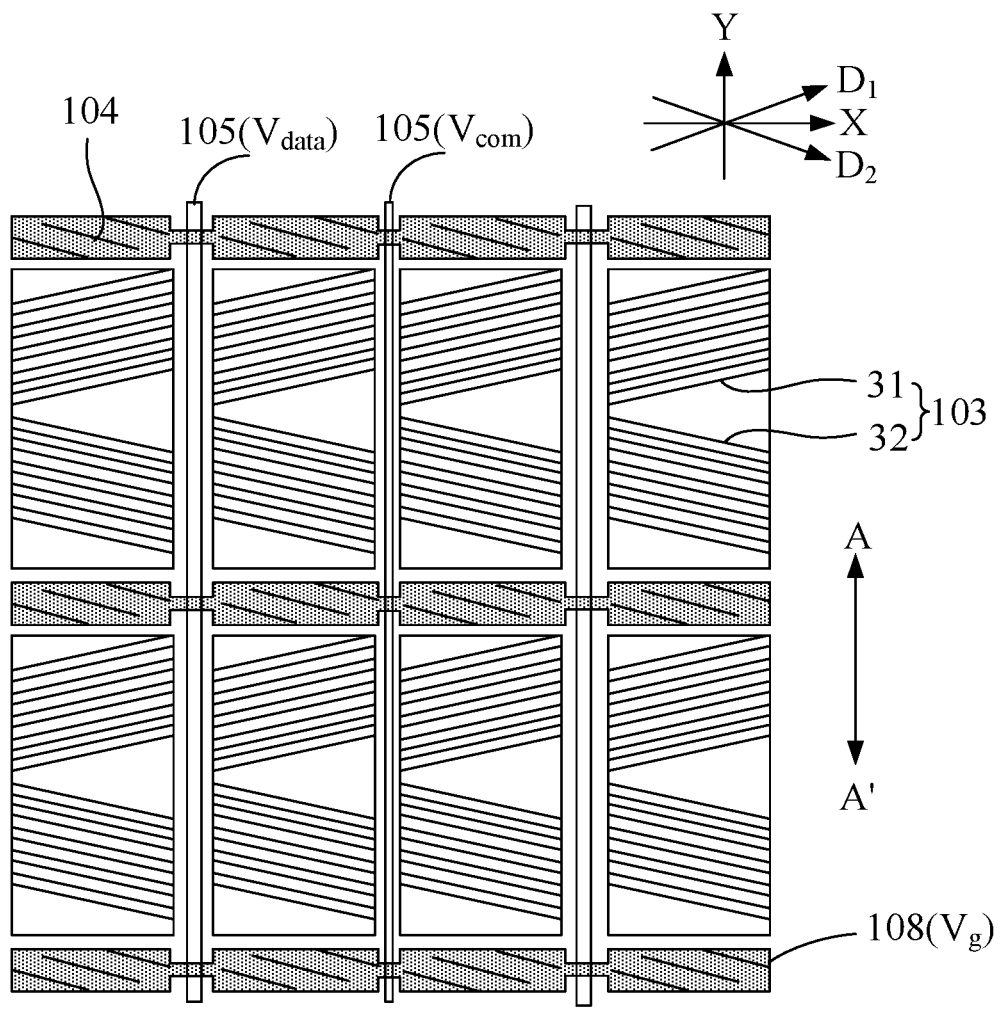
FIG. 7 is another schematic structural diagram of a display substrate provided by an embodiment of the present disclosure.
Figure 8:
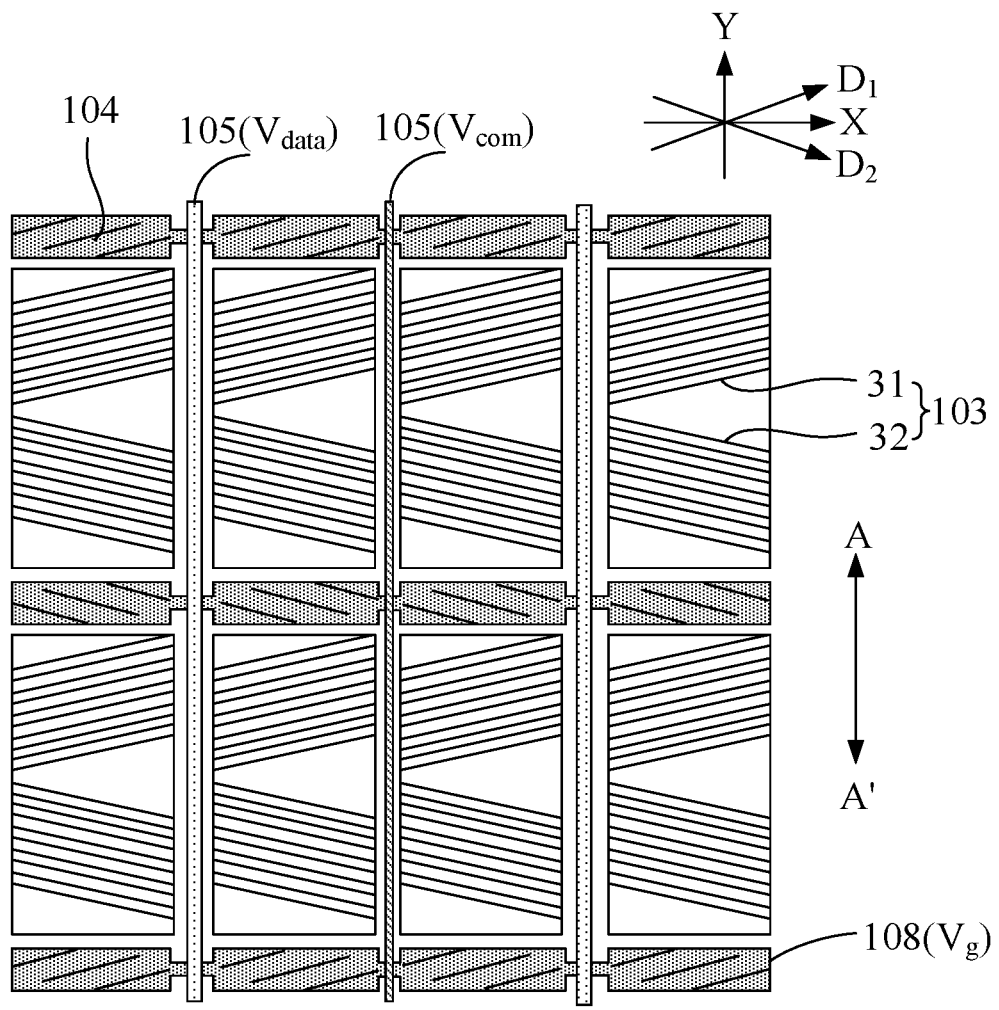
FIG. 8 is another schematic structural diagram of a display substrate provided by an embodiment of the present disclosure.

In some embodiments, in the above display substrate provided by the embodiments of the present disclosure, as shown in FIG. 6 to FIG. 8, there are a plurality of first electrodes 103, and the plurality of first electrodes 103 are arranged in an array on the base substrate 101. An orthographic projection of the pattern layer 104 on the base substrate 101 is located in an orthographic projection of a row gap of the first electrodes 103 on the base substrate 101. Generally, a black matrix (BM) shielding the row gap of the first electrodes 103 is arranged on an opposite substrate opposite to the display substrate, under the condition that the orthographic projection of the pattern layer 104 on the base substrate 101 is located in an orthographic projection of the row gap of the first electrodes 103 on the base substrate 101, the pattern layer 104 will be shielded by the black matrix, and poor light leak will not generate. In addition, image display is not carried out in a region where the black matrix is located, so the pattern layer 104 will not affect the display effect.

Figure 25:
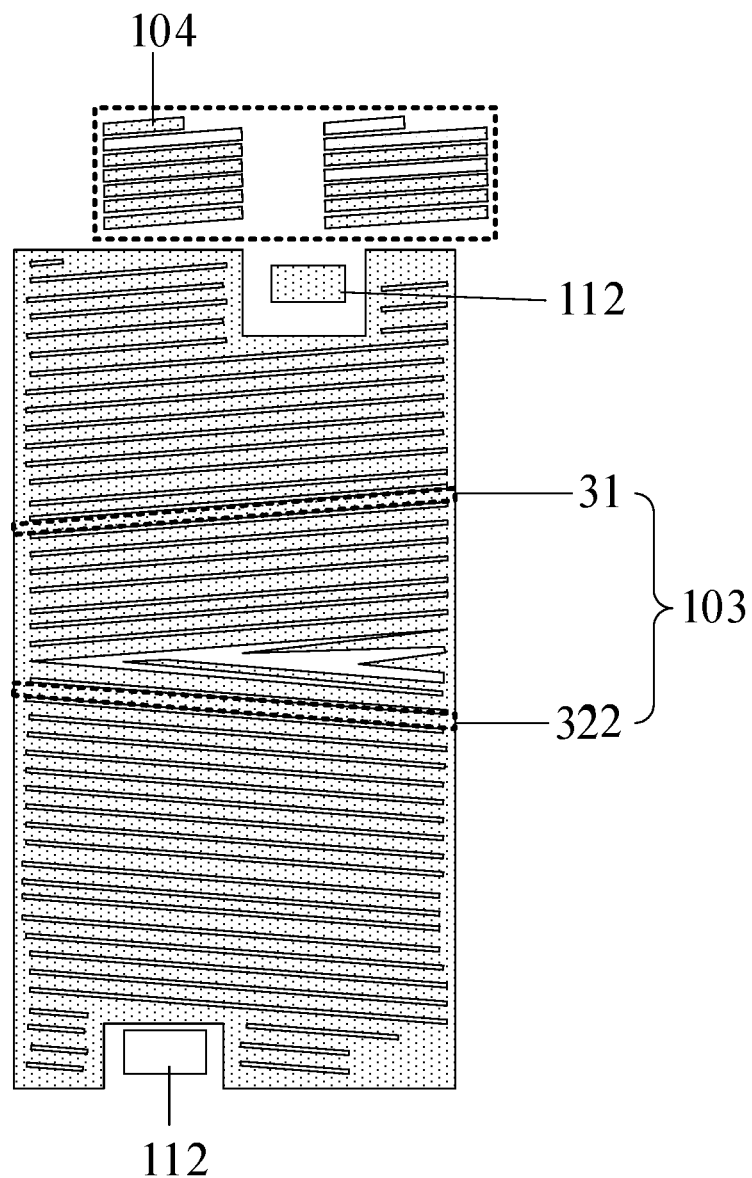
FIG. 25 is a schematic structural diagram of a first electrode, a first switching electrode and a pattern layer in FIG. 21.
Figure 27:
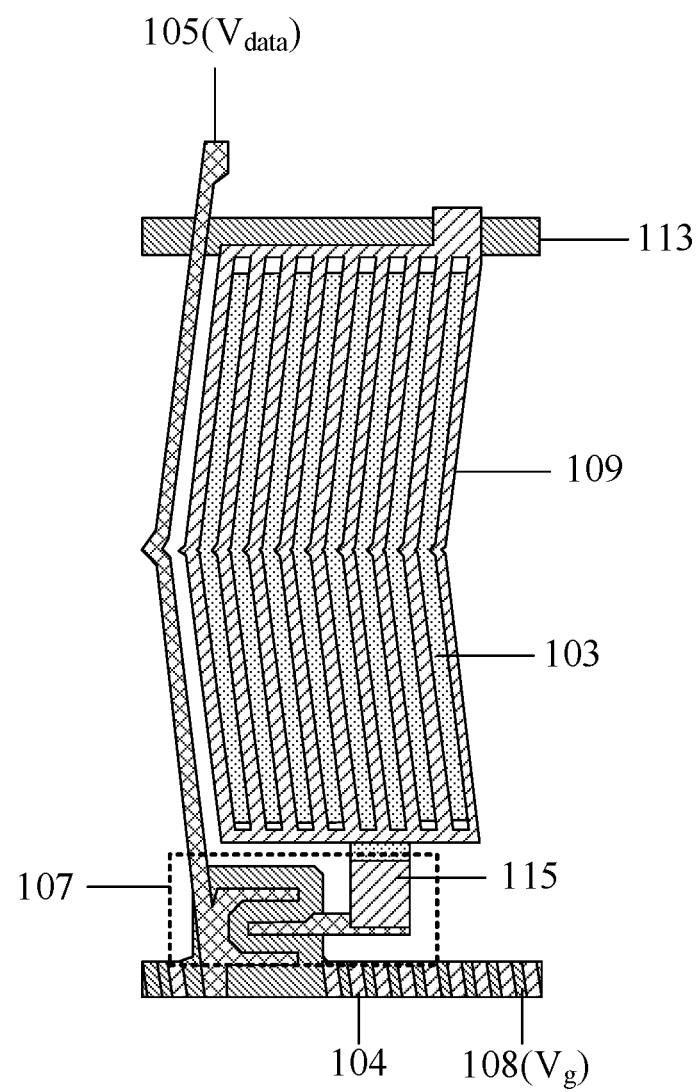
FIG. 27 is a schematic diagram of another pixel structure of a display substrate provided by an embodiment of the present disclosure.
Figure 28:
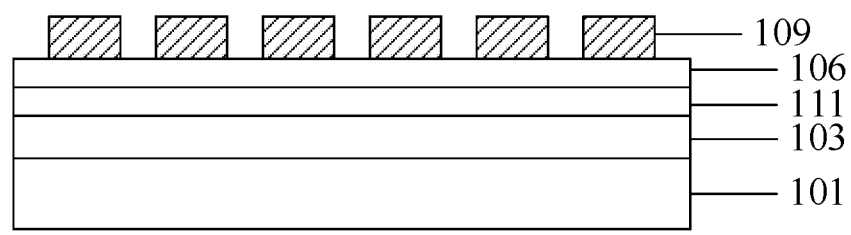
FIG. 28 is a lamination schematic diagram of a first electrode and a second electrode in FIG. 27.
Figure 29:
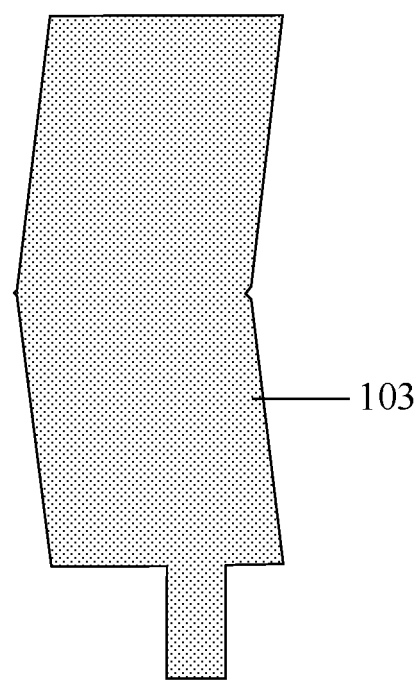
FIG. 29 is a schematic structural diagram of a first electrode in FIG. 27.
Figure 32:
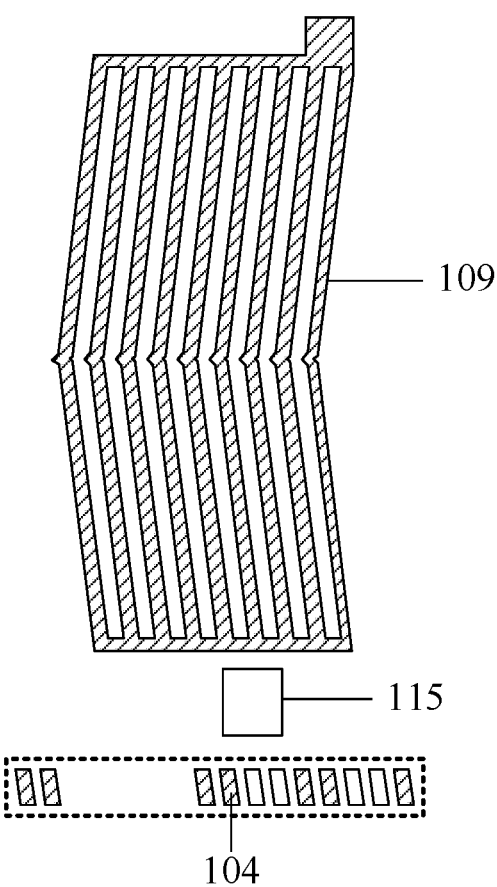
FIG. 32 is a schematic structural diagram of a second electrode, a second switching electrode and a pattern layer in FIG. 27.
Figure 33:
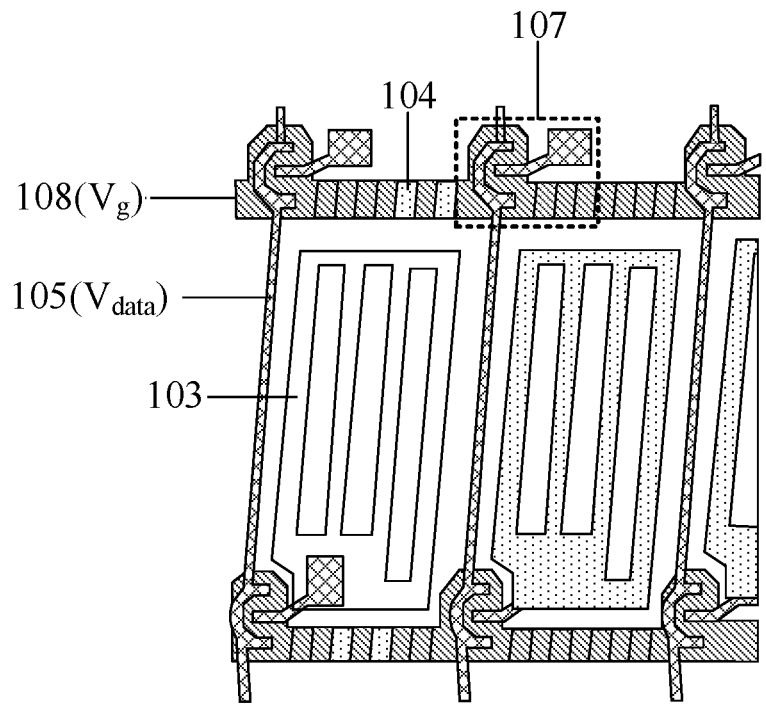
FIG. 33 is a schematic diagram of another pixel structure of a display substrate provided by an embodiment of the present disclosure.
Figure 34:
FIG. 34 is a schematic structural diagram of a second signal line and a gate of a transistor in FIG. 33.
Figure 34:
Figure 35:
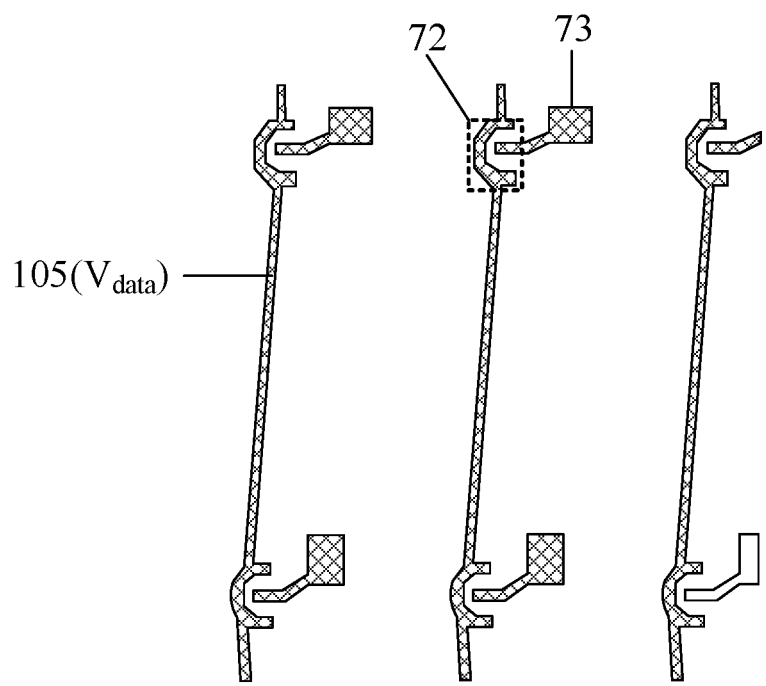
FIG. 35 is a schematic structural diagram of a first signal line, and a first pole and a second pole of a transistor in FIG. 33.
Figure 36:
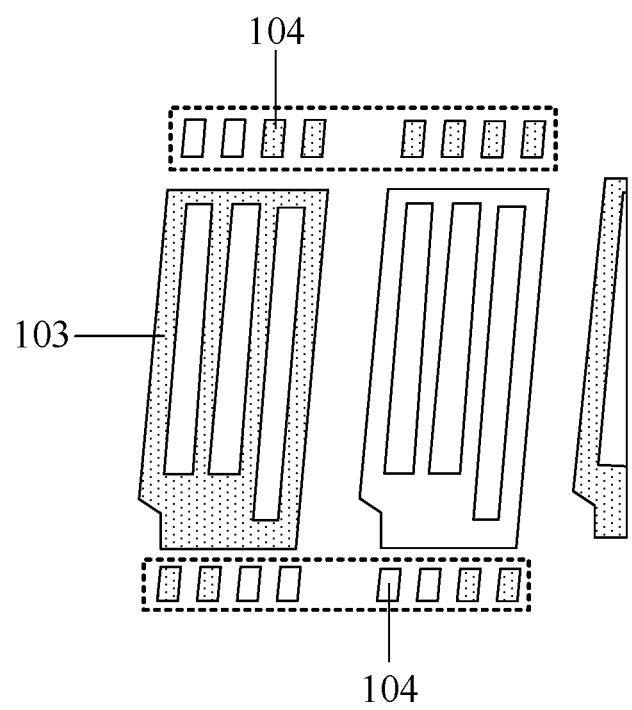
FIG. 36 is a schematic structural diagram of a first electrode and a pattern layer in FIG. 33.

In some embodiments, in the above display substrate provided by the embodiments of the present disclosure, as shown in FIG. 2, and FIG. 6 to FIG. 8, the first electrode 103 includes a first strip electrode 31 and a second strip electrode 32 which are integrally arranged. An extension direction $D_1$ of the first strip electrode 31 is intersected with a row direction X, a column direction Y and an extension direction $D_2$ of the second strip electrode 32. The extension direction $D_2$ of the second strip electrode 32 is intersected with the row direction X and the column direction Y. The pattern layer 104 extends in the extension direction $D_1$ of the first strip electrode 31 and/or the extension direction $D_2$ of the second strip electrode 32. For example, in FIG. 6, the pattern layer 104 at each row gap of the first electrodes 103 extends in the extension direction $D_1$ of the first strip electrode 31. In FIG. 7, the pattern layer 104 at each row gap of the first electrodes 103 extends in the extension direction $D_2$ of the second strip electrode 32. In FIG. 8, extension directions of the pattern layers 104 at the two adjacent row gaps of the first electrodes 103 are different, that is, the extension directions of the pattern layers 104 at the two adjacent row gaps are respectively the same as the extension direction $D_1$ of the first strip electrode 31 and the extension direction $D_2$ of the second strip electrode 32. In this way, a morphology of the pattern layer 104 may be similar to a morphology of the first electrode 103, which is beneficial to forming the alignment layer 104 with the better homogeneity on the first electrode 103 and the pattern layer 104. It should be noted that the first strip electrode 31 and the second strip electrode 32 shown in FIG. 6 may refer to FIG. 21 and FIG. 25. For example, the strip electrodes are formed on a plate electrode by slitting in FIG. 21 and FIG. 25. Alternatively, the first strip electrode 31 and the second strip electrode 32 shown in FIG. 6 may further refer to FIG. 27, FIG. 32, FIG. 33 and FIG. 36. For example, the plurality of strip electrodes in electric connections are directly formed in FIG. 27, FIG. 32, FIG. 33 and FIG. 36. The strip electrodes shown in FIG. 27 and FIG. 32 are double-domain electrodes, and an included angle of the domain electrodes is an obtuse angle. In some embodiments, the included angle of the domain electrodes may further be an acute angle. The strip electrodes shown in FIG. 33 and FIG. 36 are single-domain electrodes.

In some embodiments, a mask manufacturing the first electrode 103 in the related art may be used for manufacturing the pattern layer 104. For example, the mask manufacturing the first electrode 103 may be moved in an A direction in FIG. 6 to the row gap of the first electrodes 103. Only the local mask corresponding to the row gap of the first electrodes 103 is irradiated by controlling a light source, or the mask corresponding to the first electrodes 103 is shielded under the condition of irradiating the whole mask by the light source, then only the row gap of the first electrodes 103 is exposed and developed, and thus, the pattern layer 104 with the extension direction same as the extension direction $D_1$ of the first strip electrode 31 is manufactured at the row gap of the first electrodes 103. Similarly, under the condition of moving the mask manufacturing the first electrode 103 to the row gap of the first electrodes 103 in an A' direction in FIG. 7, the pattern layer 104 with the extension direction same as the extension direction $D_2$ of the second strip electrode 32 may be manufactured at the row gap of the first electrodes 103. In addition, the mask manufacturing the first electrode 103 is moved to the row gap of the first electrodes 103 in an A direction in FIG. 8, and only the local mask corresponding to the odd row gap of the first electrodes 103 is irradiated by controlling a light source, or the mask corresponding to the first electrodes 103 and the local mask corresponding to the even row gaps are shielded under the condition of irradiating the whole mask by the light source, then the odd row gap is only exposed and developed, and thus the pattern layer 104 with the extension direction same as the extension direction $D_1$ of the first strip electrode 31 is manufactured at the odd row gap. The mask manufacturing the first electrode 103 may further be moved to the row gap of the first electrodes 103 in an A' direction in FIG. 8, and only the local mask corresponding to the even row gap of the first electrodes 103 is irradiated by controlling a light source, or the mask corresponding to the first electrodes 103 and the local mask corresponding to the odd row gaps are shielded under the condition of irradiating the whole mask by the light source, then the even row gap is only exposed and developed, so that the pattern layer 104 with the extension direction same as the extension direction $D_2$ of the second strip electrode 32 is manufactured at the even row gap. In this way, the extension directions of the pattern layer 104 at the two adjacent row gaps are different.

Under the condition of manufacturing the pattern layer 104 by adopting the mask of the first electrode 103, extra masks for manufacturing the pattern layer 104 may be avoided, which is beneficial to saving costs. As shown in FIG. 6 to FIG. 8, a line width of the manufactured pattern layer 104 is the same as a line width of the first strip electrode 31 or the second strip electrode 32 which has the same extension direction, and a line distance of the pattern layer 104 is the same as a line distance of the first strip electrode 31 or the second strip electrode 32 which has the same extension direction. That is, the morphology of the pattern layer 104 is the same as the morphology of the first electrode 103, which is beneficial to forming the alignment layer 102 with the better homogeneity on the first electrode 103 and the pattern layer 104.

Figure 9:
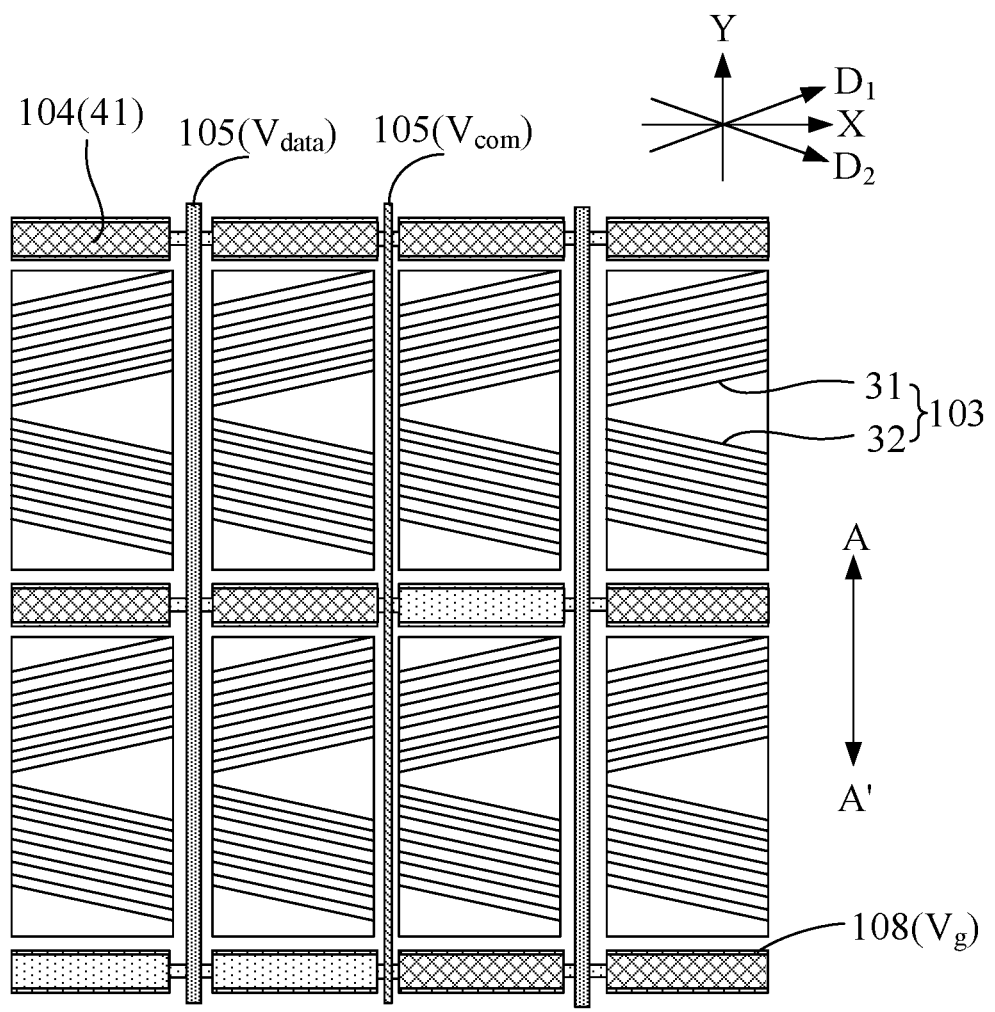
FIG. 9 is another schematic structural diagram of a display substrate provided by an embodiment of the present disclosure.

In some embodiments, in the above display substrate provided by the embodiments of the present disclosure, as shown in FIG. 9, the pattern layer 104 includes a plurality of block patterns 41 arranged at intervals at a same row gap of the first electrodes 103. The block pattern 41 extends in the row direction X. The pattern layer 104 constituted by the block patterns 41 is simpler in structure and less in corresponding manufacturing difficulty.

In some embodiments, the above display substrate provided by the embodiments of the present disclosure, as shown in FIG. 2, and FIG. 6 to FIG. 9, may further include a first signal line 105. Optionally, the first signal line 105 is located between the base substrate 101 and the first electrode 103 and is mutually insulated with the first electrode 103 through an insulating layer 106. The first signal lines 105 may all be data lines $V_{data}$, may include the $V_{data}$ and common electrode lines $V_{com}$, or may further include touch signal lines and the like, which is not limited here. The orthographic projection of the first signal line 105 on the base substrate 101 is located in an orthographic projection of a column gap of the first electrodes 103 on the base substrate 101. The orthographic projection of the pattern layer 104 on the base substrate 101 does not overlap the orthographic projection of the first signal line 105 on the base substrate 101. Materials of the first electrodes 103 are conducting materials, so that the pattern layer 104 manufactured at the same layer and made of the same material with the first electrodes 103 also has electrical conductivity. Parasitic capacitance will form between the pattern layer 104 and the first signal line 105 under the condition that the pattern layer 104 overlaps with the first signal line 105, causing the pattern layer 104 interfering with signals of the first signal line 105. Therefore, in order to avoid the pattern layer 104 interfering with the signals of the first signal line 105, the orthographic projection of the pattern layer 104 on the base substrate 101 does not overlap the orthographic projection of the first signal line 105 on the base substrate 101.

Figure 10:
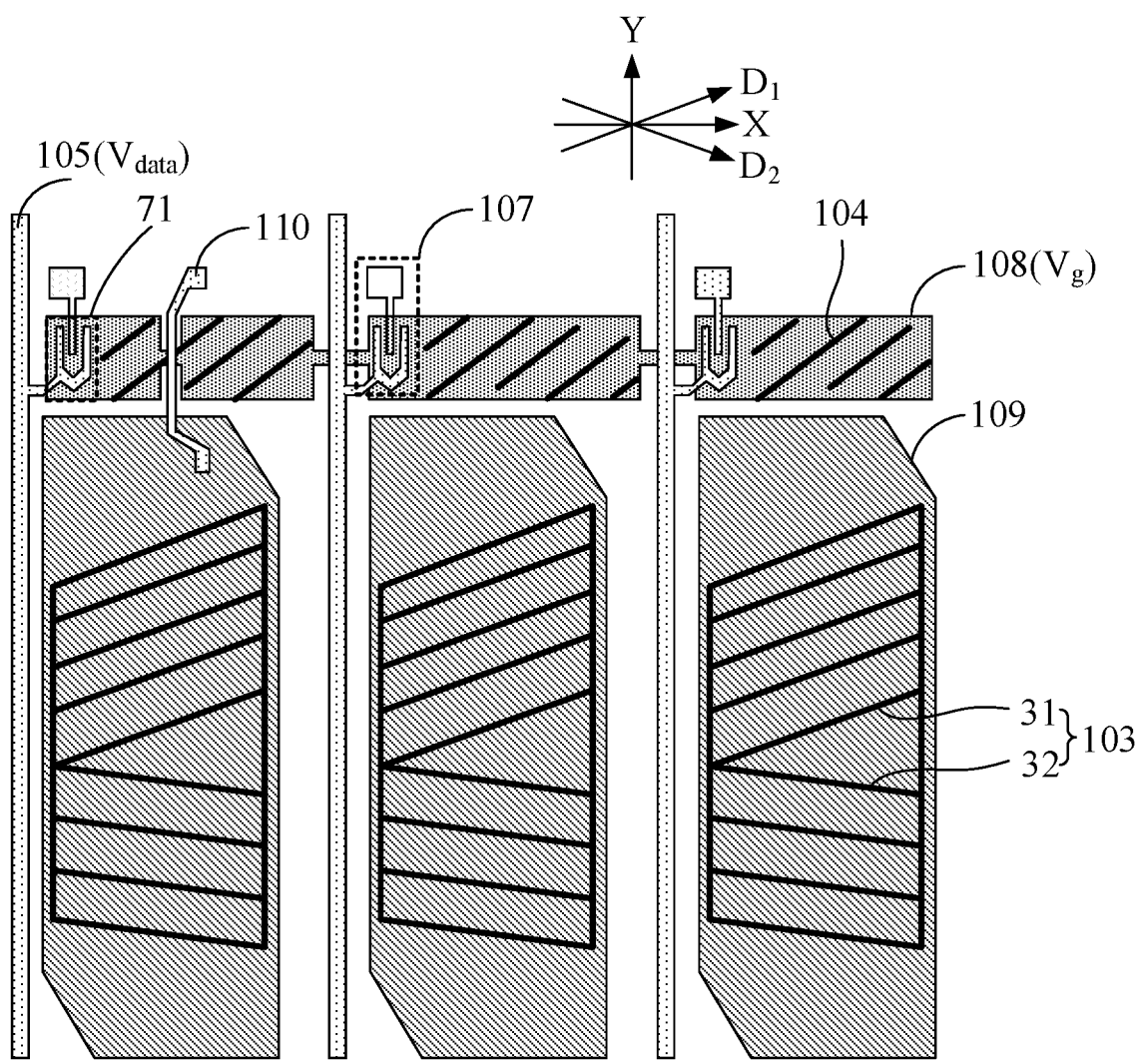
FIG. 10 is another schematic structural diagram of a display substrate provided by an embodiment of the present disclosure.
Figure 11:
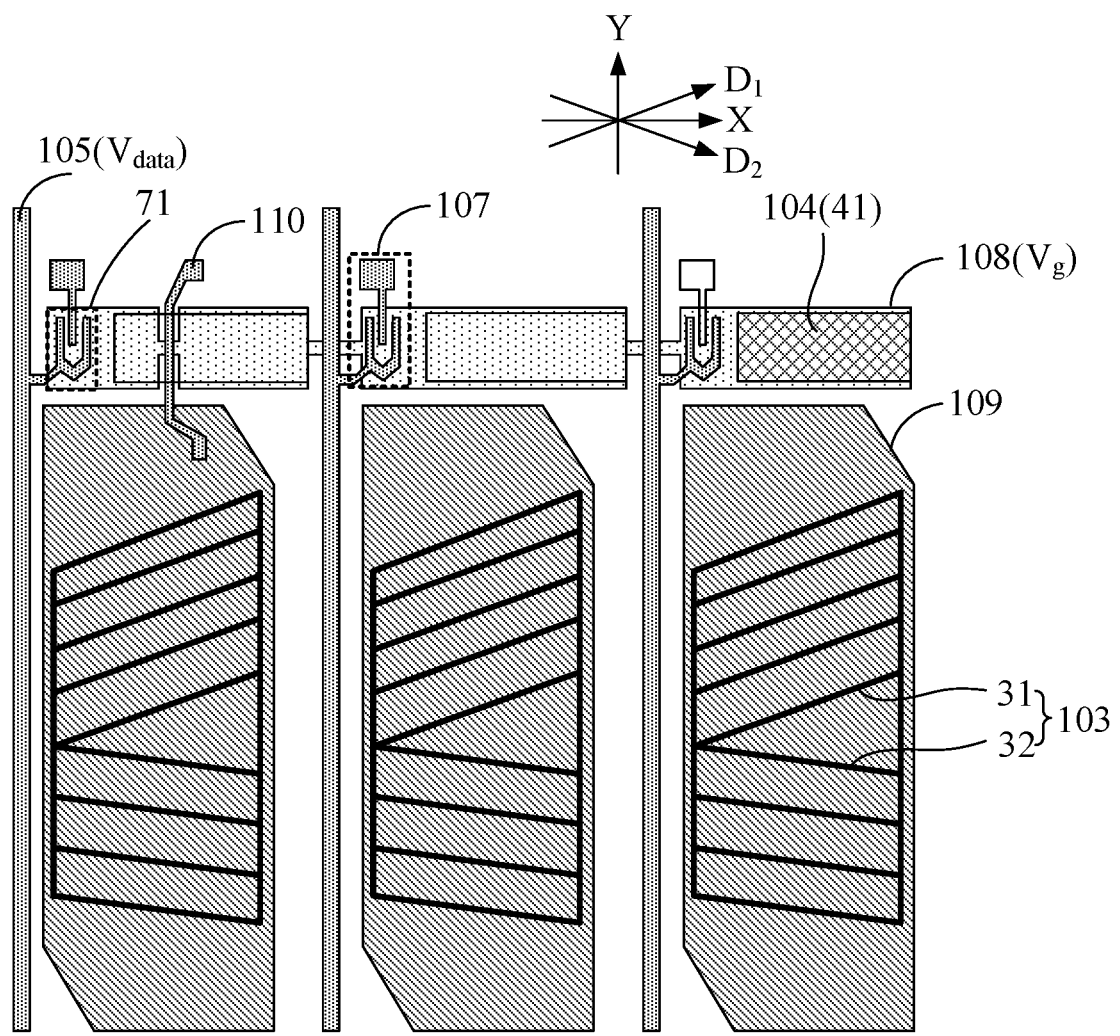
FIG. 11 is another schematic structural diagram of a display substrate provided by an embodiment of the present disclosure.

In some embodiments, the above display substrate provided by the embodiments of the present disclosure, as shown in FIG. 10 and FIG. 11, may further include a transistor 107. At least part of the first signal lines 105 is electrically connected with the transistor 107. Optionally, under the condition of the first signal lines 105 being all the data lines $V_{data}$, the first signal lines 105 are electrically connected with the transistors 107. Under the condition of the first signal lines 105 being the data lines $V_{data}$ and the common electrode lines $V_{com}$, the data lines $V_{data}$ in the first signal lines 105 are electrically connected with the transistors 107. In some embodiments, the data lines $V_{data}$ and the first poles of the transistors 107 electrically-connected with the data lines $V_{data}$ may be formed through a composition process. Optionally, the first pole of the transistor 107 may be a source or a drain. Optionally, in the present disclosure, in order to avoid the pattern layer 104 overlapping with the first signal line 105 to form parasitic capacitance to affect the stability of the transistor 107, the orthographic projection of the pattern layer 104 on the base substrate 101 does not overlap an orthographic projection of the transistor 107 on the base substrate 101.

Figure 12:
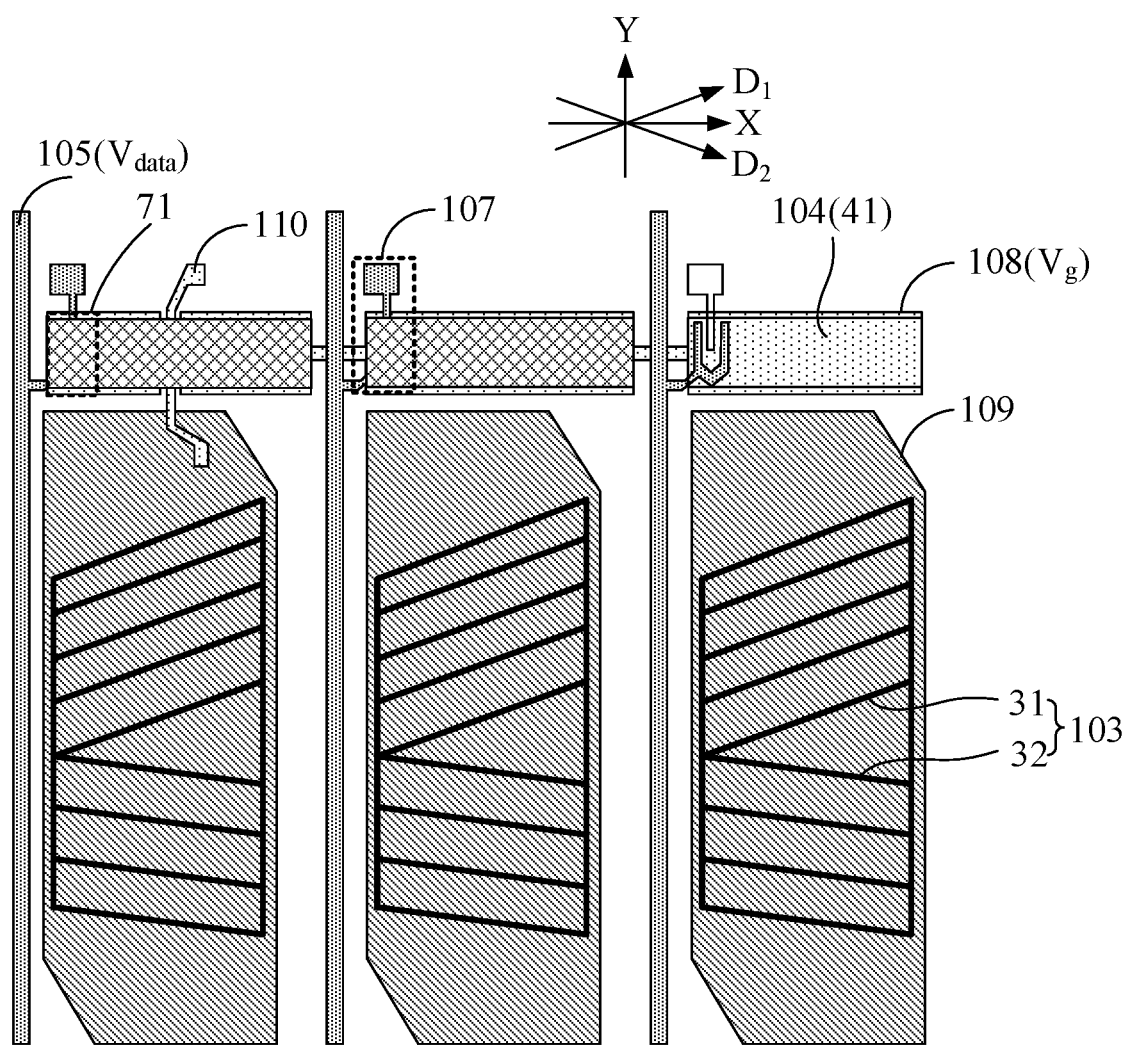
FIG. 12 is another schematic structural diagram of a display substrate provided by an embodiment of the present disclosure.
Figure 13:
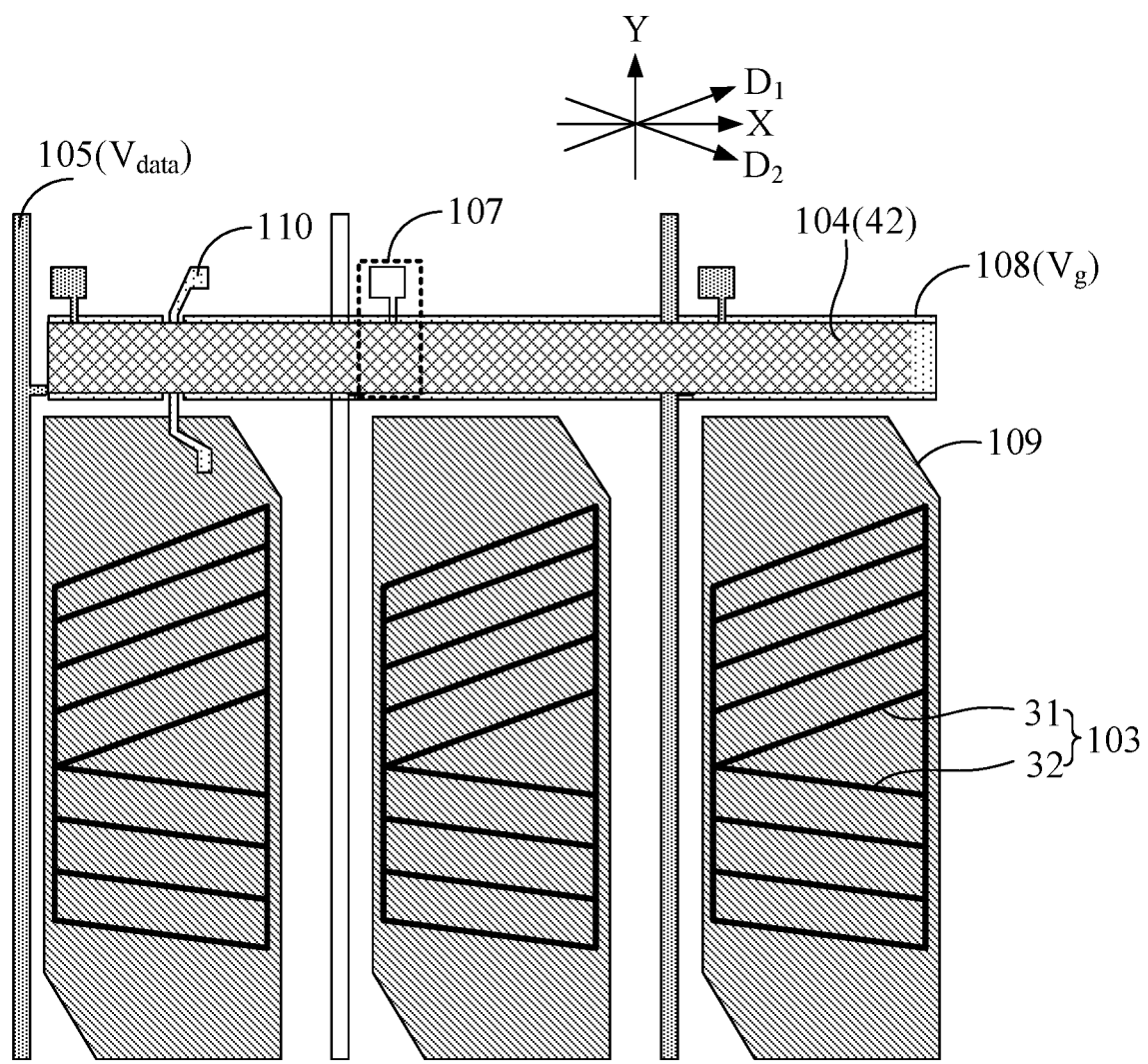
FIG. 13 is another schematic structural diagram of a display substrate provided by an embodiment of the present disclosure.

It should be understood that since there is the insulating layer 106 between a layer where the first signal line 105 is located and a layer where the pattern layer 104 is located, the first signal line 105 and the pattern layer 104 will not be in short circuit. Based on this, in some embodiments, as shown in FIG. 1 and FIG. 12, the orthographic projection of the pattern layer 104 on the base substrate 101 overlaps with the orthographic projection of the transistor 107 on the base substrate 101. In some other embodiments, as shown in FIG. 13, the pattern layer 104 includes strip patterns 42 extending in the row direction X at the row gap, a length of the strip pattern 42 in the row direction X is the same as a length of the row gap, then the orthographic projection of the pattern layer 104 on the base substrate 101 may overlap both the orthographic projection of the first signal line 105 on the base substrate 101 and the orthographic projection of the transistor 107 on the base substrate 101. As shown in FIG. 13, the pattern layer 104 is composed of the plurality of strip patterns 42 extending in the row gap, this structure is simpler, and the corresponding manufacturing difficulty is less. Optionally, the length of the strip pattern 42 in the row direction X is different from the length of the row gap. For example, an extension direction of the strip pattern 42 in the row direction X is the same as an extension direction of a gate line, and the specific length and width are not limited.

In some embodiments, the above display substrate provided by the embodiments of the present disclosure, as shown in FIG. 10 and FIG. 11, may further include a second signal line 108. Optionally, the second signal line 108 may be a gate line $V_g$ integrally arranged with a gate 71 of the transistor 107, and the second signal line 108 is located between a layer where the first signal line 105 is located and the base substrate 101. An orthographic projection of the second signal line 108 on the base substrate 101 may be located in the orthographic projection of the row gap of the first electrodes 103 on the base substrate 101. Further, the orthographic projection of the pattern layer 104 on the base substrate 101 may be located in the orthographic projection of the second signal line 108 on the base substrate 101. Since it is found that an accumulation region of the alignment layer 102 is located in a region where the second signal line 108 is located, the pattern layer 104 conductive to preventing the alignment layer 102 from accumulation is arranged in the region where the second signal line 108 is located.

In addition, it is found that when an accumulation width of the alignment layer 102 on the second signal line 108 is more than 60% of a line width of the second signal line 108, there will be bad things happening on a macro level. Based on this, in order to avoid bad things happening, in the above display substrate provided by the embodiments of the present disclosure, a ratio of a width of the pattern layer 104 in the column direction Y to a width of the second signal line 108 in the column direction Y is greater than or equal to 3/5 and less than or equal to 1.

Figure 14:
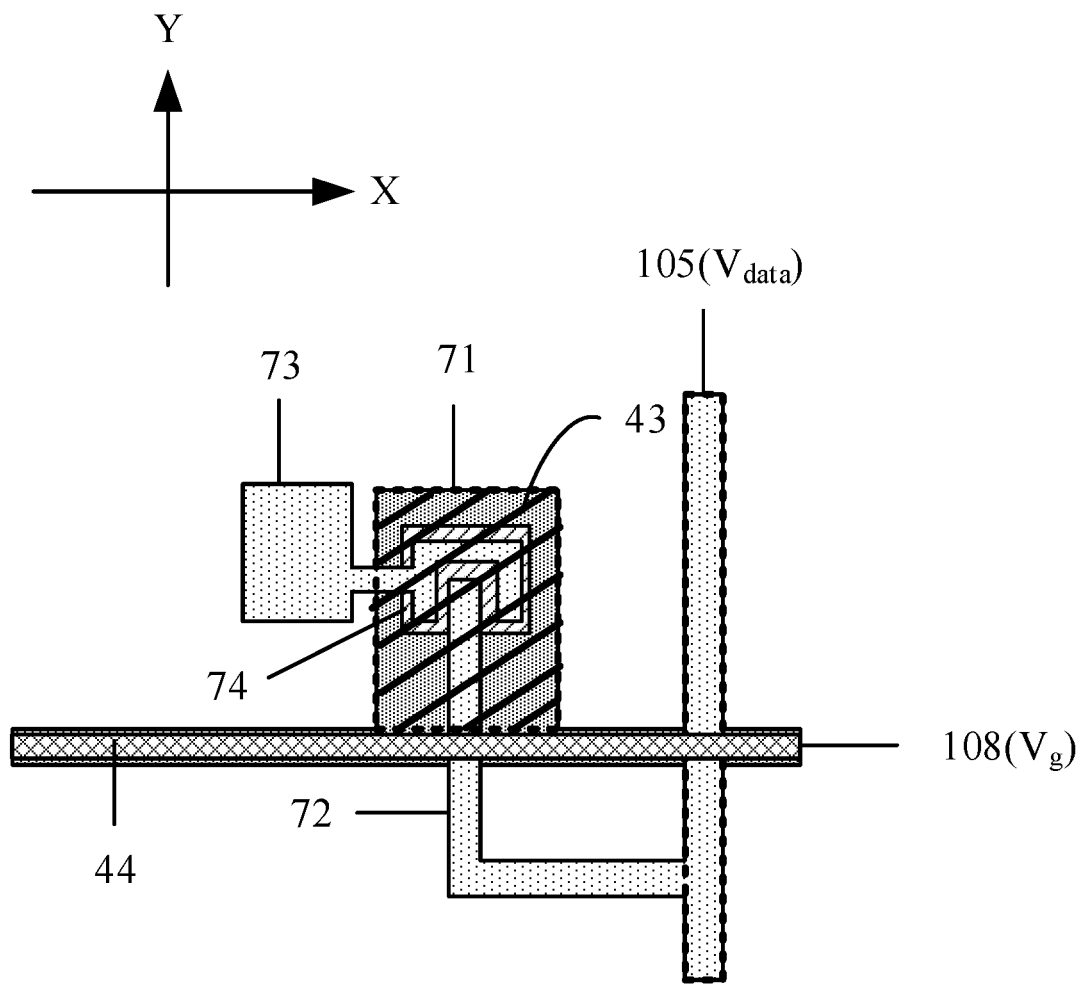
FIG. 14 is a schematic structural diagram of a transistor in a display substrate provided by an embodiment of the present disclosure.

In some embodiments, as shown in FIG. 10 and FIG. 11, a part of the gate line $V_g$ may be reused as the gate 71 of the transistor 107. Alternatively, as shown in FIG. 14, FIG. 27, FIG. 30, FIG. 33 and FIG. 34, the gate 71 may protrude relative to the gate line $V_g$. Continuing to refer to FIG. 14, in order to prevent accumulation of the alignment layer 102 on the second signal line 108 (namely the gate line $V_g$) and the gate 71, the pattern layer 104 may include a plurality of first portions 43 intersected with the row direction X and the column direction Y and a second portion 44 extending in the row direction X. An orthographic projection of the first portions 43 on the base substrate 101 is located in the orthographic projection of the gate 71 on the base substrate 101, and an orthographic projection of the second portion 44 on the base substrate 101 is located in the orthographic projection of the second signal line 108 on the base substrate 101. It can be seen that the first portion 43 shown in FIG. 14 is of an inclined strip structure, namely a strip electrode with an extending direction same as a domain extension direction of a pixel electrode and having a width same as a width of the pixel electrode. The second portion 44 is of a block structure. Further, in some embodiments, the first portions 43 and the second portion 44 may be both of the block structure or the inclined strip structure, or the first portion 43 is of the block structure, and the second portion 44 is of the inclined strip structure. That is, the structure of the first portions 43 and the structure of the second portion 44 may be the same, or may be different, which is not limited.

Figure 15:
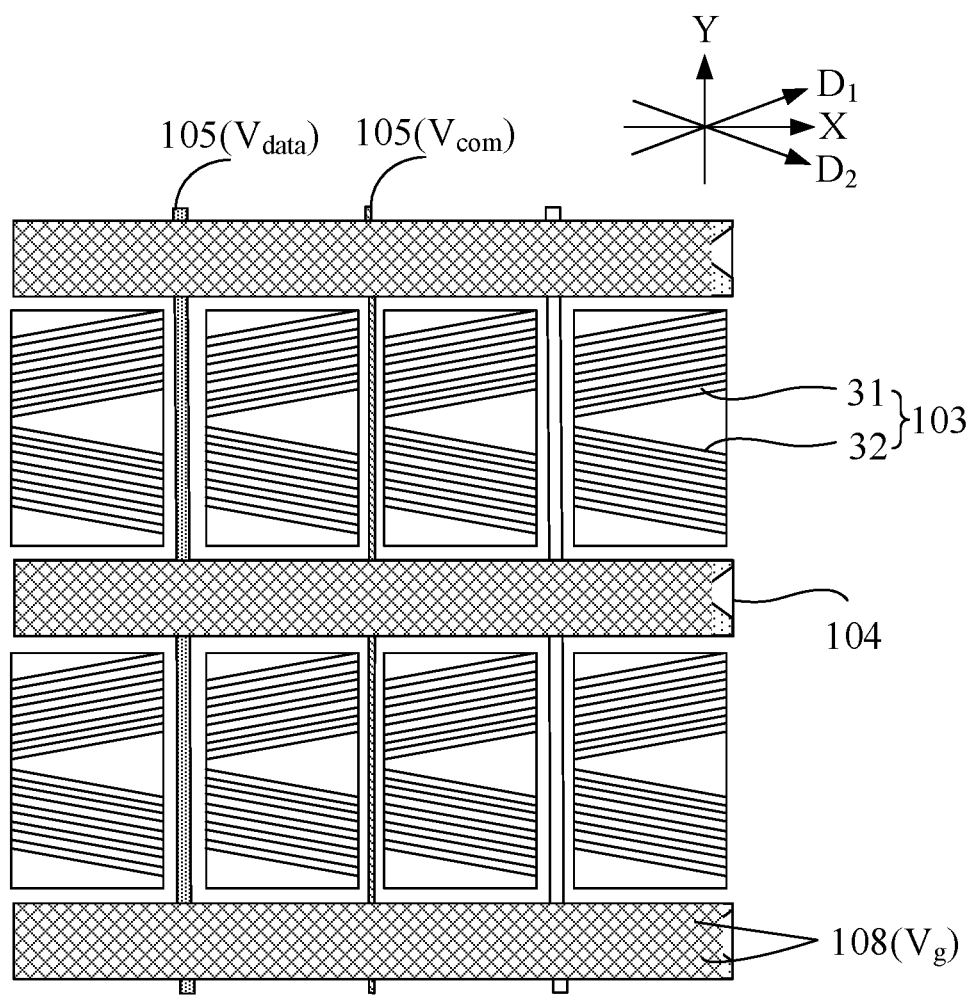
FIG. 15 is another schematic structural diagram of a display substrate provided by an embodiment of the present disclosure.

In some embodiments, in the above display substrate provided by the embodiments of the present disclosure, as shown in FIG. 15, two second signal lines 108 are correspondingly arranged at the same row gap of the first electrodes 103. In the same row gap of the first electrodes 103, orthographic projections of the two second signal lines 108 on the base substrate 101 is located in the orthographic projection of the pattern layer 104 on the base substrate 101, so as to prevent, through the pattern layer 104, the alignment layer 102 from generating accumulation in a region where the second signal lines 108 are located.

Figure 16:
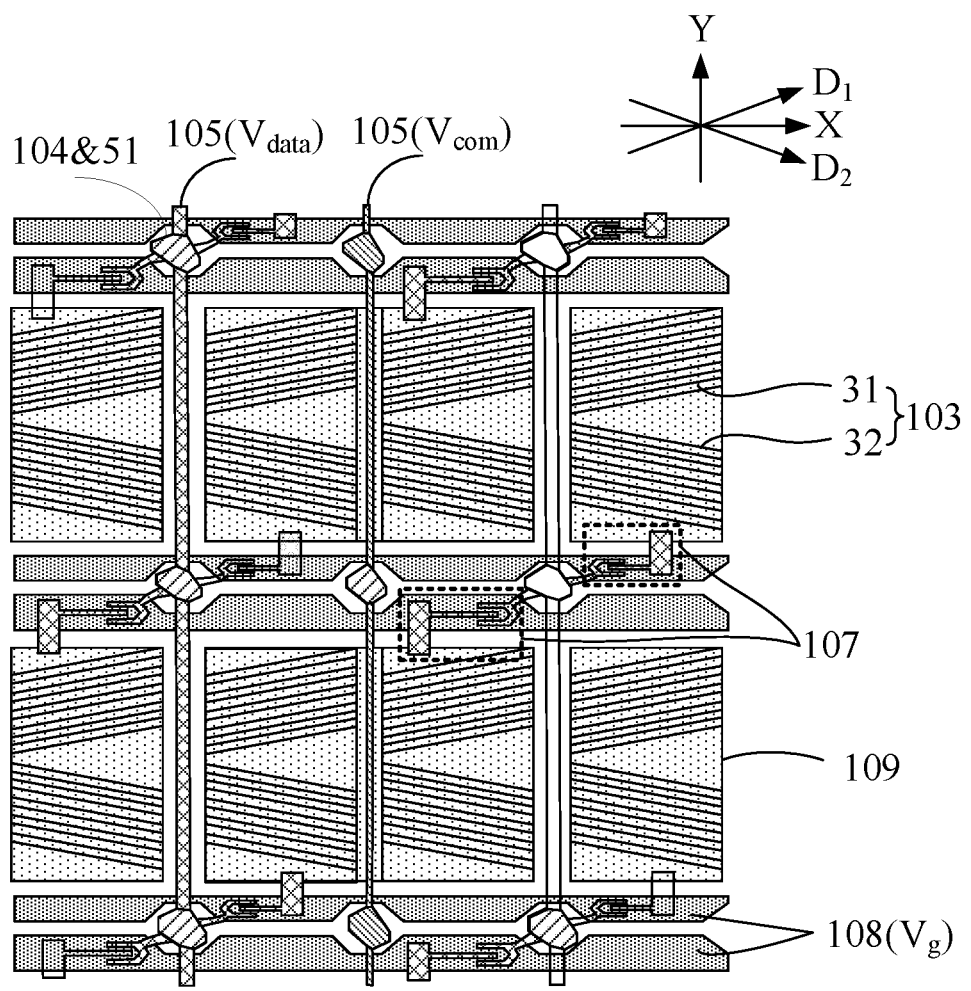
FIG. 16 is another schematic structural diagram of a display substrate provided by an embodiment of the present disclosure.

In some embodiments, in the above display substrate provided by the embodiments of the present disclosure, as shown in FIG. 16, the first signal line 105 includes an island structure 51 located at an intersected position of the column gap of the first electrodes 103 and a gap of the two second signal lines 108. The orthographic projection of the pattern layer 104 on the base substrate 101 is coincided with an orthographic projection of the island structure 51 on the base substrate 101. It needs to be explained that in the embodiments of the present disclosure, due to the restriction of process conditions or measurement and the influence of other factors. "Be coincided with" may be right coincided with. or there may be some deviations (such as ±2 μm deviations), a "coincided" relationship between correlated features belongs to the protection scope of the present disclosure as long as meeting an allowed error. It needs to be explained that the followings are also belong to the protection scope of the present application: the orthographic projection of the pattern layer 104 on the base substrate 101 is in the orthographic projection of the island structure 51 on the base substrate 101, or a part of the orthographic projection of the pattern layer 104 on the base substrate 101 is beyond the orthographic projection of the island structure 51 on the base substrate 101. In addition, under the condition that the pattern layer 104 shown in FIG. 15 covers the two second signal lines 108 at the same row gap, the island structure 51 is located at the gap intersected position of the column gap of the first electrodes 103 and the two second signal lines 108, the pattern layer 104 in FIG. 15 further covers the island structure 51. That is, the pattern layers 104 are both arranged on the second signal lines 108 and the island structure 51.

Figure 17:
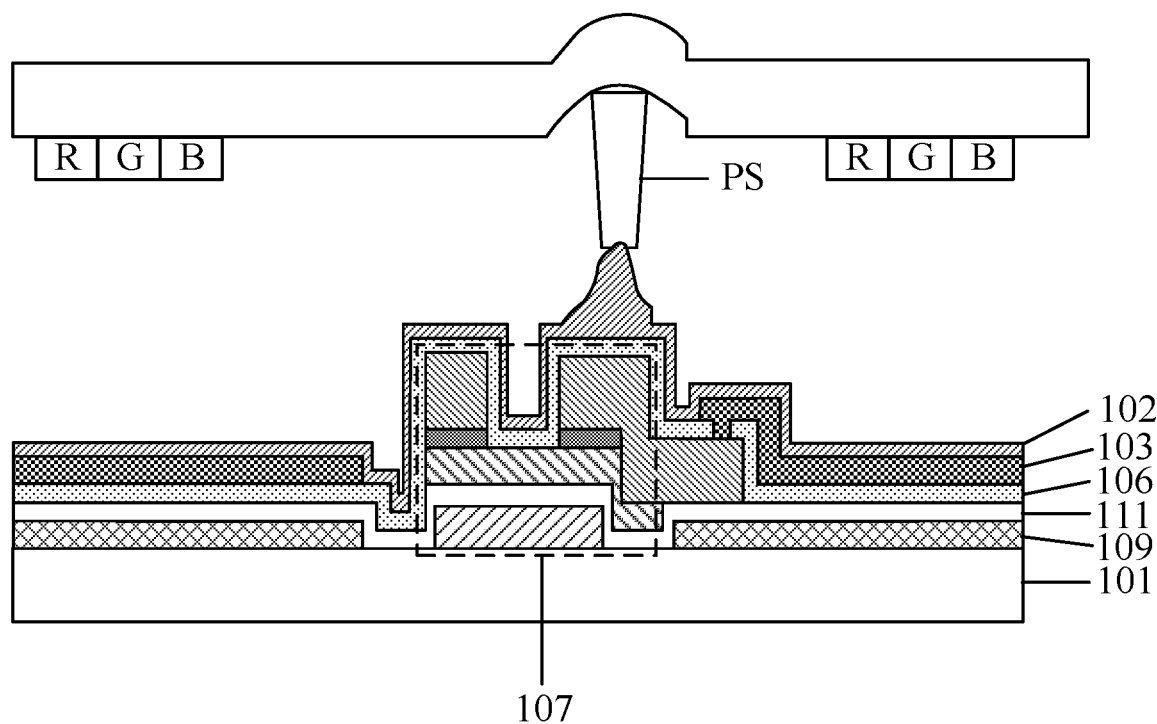
FIG. 17 is a schematic diagram of heterogeneous box thicknesses caused by alignment layer accumulation.

Generally on an opposite substrate opposite to the display substrate, a spacer (PS) keeping the box thickness (Gap) between display substrate and the opposite substrate to be stable is arranged. The spacer (PS) is in contact with the alignment layer 102 at the island structure 51. As shown in FIG. 17, if the alignment layer 102 is accumulated at the island structure 51, after the spacer (PS) presses against the accumulated alignment layer 102, the Gap at the position of the island structure 51 will be increased, and the problem of uneven display (Mura) caused by inhomogenous Gaps is caused. In the present disclosure, the pattern layer 104 capable of preventing accumulation of the alignment layer 102 is arranged at the position of the island structure 51, so at the position of the island structure 51, the spacer (PS) is in contact with the alignment layer 102 with a uniform film thickness, an abnormal phenomenon of Gap increased will not happen, so that the problem of uneven display is effectively solved. Optionally, a liquid crystal display panel includes a color film substrate (such as the above opposite substrate), an array substrate (such as the above display substrate) and a liquid crystal arranged between the color film substrate and the array substrate. The spacer (PS) may be arranged on the side of the color film substrate, and the other end of the spacer (PS) faces towards the island structure 51 of the array substrate. Alternatively, the spacer (PS) may be arranged on the side of the array substrate, that is, the spacer (PS) is directly arranged at the position corresponding to the island structure 51. Herein, the island structure 51 and the data lines may be directly prepared at the same layer and made of the same material. When the spacer (PS) abuts against the position of the island structure 51, the compressive capacity of the liquid crystal display panel may be increased.

Figure 18:
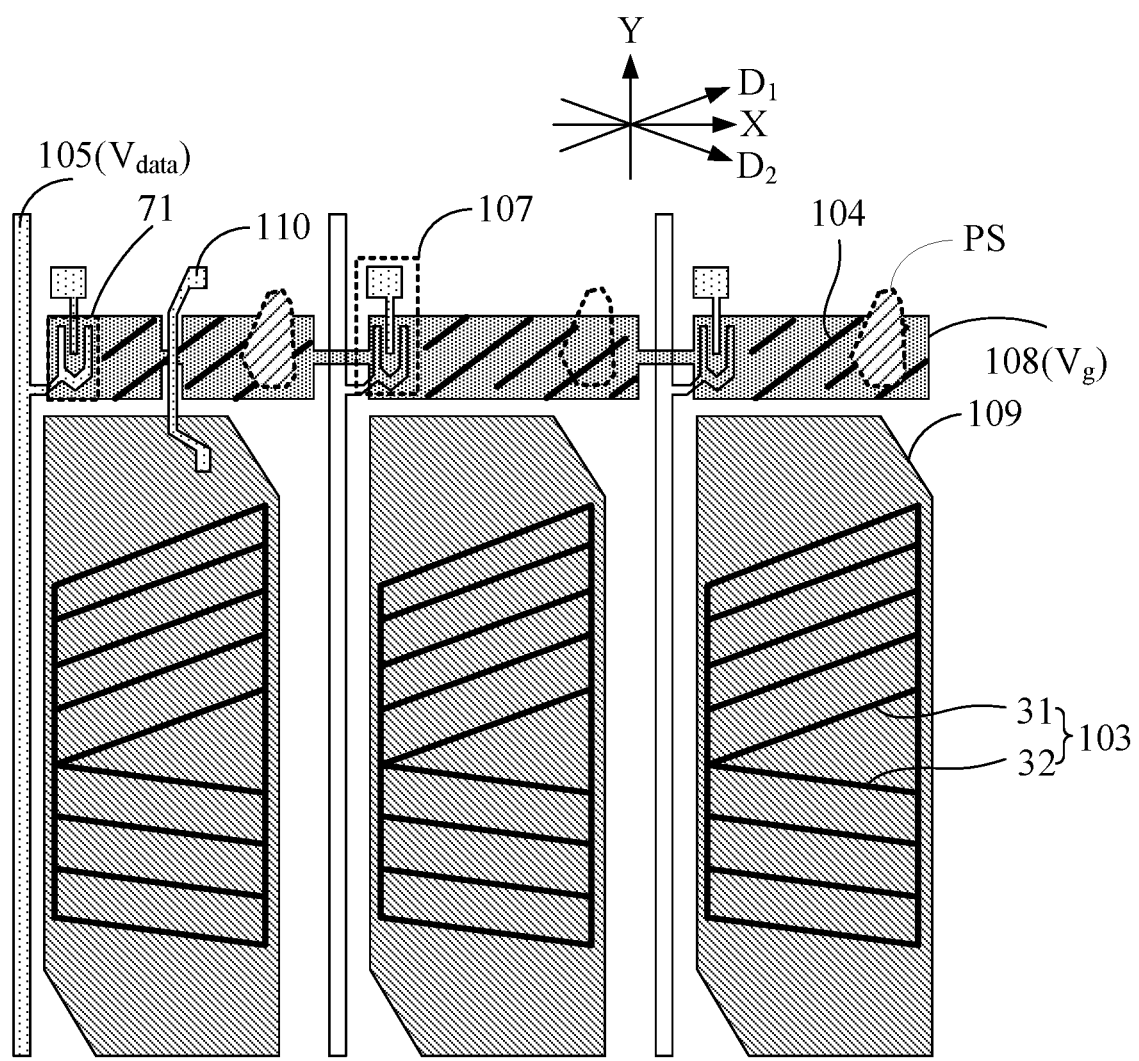
FIG. 18 is another schematic structural diagram of a display substrate provided by an embodiment of the present disclosure.

It needs to be explained that in the present disclosure, the position of the spacer (PS) is not limited to correspond to the position of the island structure 51. In some embodiments, as shown in FIG. 18, the position of the spacer (PS) may further be arranged at the region where the second signal lines 108 are located. That is, after the display substrate and the opposite substrate are box aligned, the spacer (PS) is in contact with an alignment layer PI of the region where the second signal lines 108 are located. Since a film layer at the uppermost layer of the display substrate is the alignment layer PI, whether where is the position of the spacer (PS), the spacer (PS) is in contact with the alignment layer 102. That is, the alignment layer 102 includes a position region used for arranging the spacer (PS). In order to prevent the increased local Gap caused by accumulation of the alignment layer 102, an orthographic projection of the position region of the spacer (PS) on the base substrate 101 may be arranged in the orthographic projection of the pattern layer 104 on the base substrate 101.

Continuing to refer to FIG. 16, under the condition that the first signal lines 105 are the data lines $V_{data}$, at one row gap of the first electrodes 103, one island structure 51 may be electrically connected with first poles of two transistors 107 respectively. The gate of one of the two transistors 107 is electrically connected with one second signal line 108, and the gate of the other transistor 107 is electrically connected with the other second signal line 108. A second pole of one of the two transistors 107 is electrically connected with the first electrode 103 of the odd column on one side of the row gap, and a second pole of the other transistor 107 is electrically connected with the first electrode 103 of the even column on the other side of the row gap. In this way, signals may be loaded to the two columns of first electrodes 103 through one data line $V_{data}$, so that the quantity and line distribution space of the data lines $V_{data}$ may be saved. Optionally, the saved line distribution space may be used for arranging the common electrode line $V_{com}$. The common electrode line $V_{com}$ may be electrically connected with the second electrode 109, so that the integral resistance of the second electrode 109 is low, and further, the voltage homogeneity and stability of the second electrode 109 are further improved.

In some embodiments, as shown in FIG. 16, the second electrode 109 may be located between the layer where the first electrode 103 is located and the base substrate 101, and the orthographic projection of the first electrode 103 on the base substrate 101 overlaps with the orthographic projection of the second electrode 109 on the base substrate 101, so that an electric field driving the liquid crystal to deflect may be formed between the first electrode 103 and the second electrode 109. Optionally, the second electrode 109 and the gate 71 of the transistor 107 may be arranged at the same layer. In order to guarantee the transmittance, the second electrode 109 is manufactured by adopting transparent conducting material(s) such as indium tin oxide (ITO), indium zinc oxide (IZO) and zinc oxide (ZnO). In order to enable the resistance of the gate 71 to be small, the gate 71 may be manufactured by adopting metal material(s), alloy material (s) and the like. Optionally, material(s) of the gate 71 may include molybdenum (Mo), aluminum (Al), titanium (Ti), copper (Cu) and the like. The gate 71 may be of a single-layer metal structure or a multilayer metal structure. Exemplarily, the multilayer metal structure may constitute of a titanium metal layer/an aluminum metal layer/a titanium metal layer which are stacked. In addition, in order to meet the requirement of the transmittance, the first electrode 103 may be manufactured by adopting transparent conducting material(s) such as indium tin oxide (ITO), indium zinc oxide (IZO) and zinc oxide (ZnO). Under the condition that the first electrode 103 is slit electrodes formed by the first strip electrode 31 and the second strip electrode 32, the transmittance may further be improved through slits.

It is worth noting that as shown in FIG. 21, FIG. 23, FIG. 25, FIG. 33 and FIG. 36, the first electrode 103 may be the pixel electrode, and the second electrode 109 may be the common electrode. In some embodiments, as shown in FIG. 27 to FIG. 29 and FIG. 32, the first electrode 103 may be the common electrode, and the second electrode 109 may be the pixel electrode. That is, as shown in FIG. 21, FIG. 23, FIG. 25, FIG. 33 and FIG. 36, the pixel electrode is the strip electrode formed through slitting design, and the common electrode is a plate electrode; or, as shown in FIG. 27 to FIG. 29 and FIG. 32, the common electrode may be the strip electrode formed through slitting design, and the pixel electrode is a plate electrode, which is not limited here. In addition, according to the present disclosure, the first electrode 103 and the second electrode 109 are both located on the display substrate, but in some embodiments, the first electrode 103 and the second electrode 109 may be arranged on the display substrate and the opposite substrate respectively, which is not limited.

Figure 19:
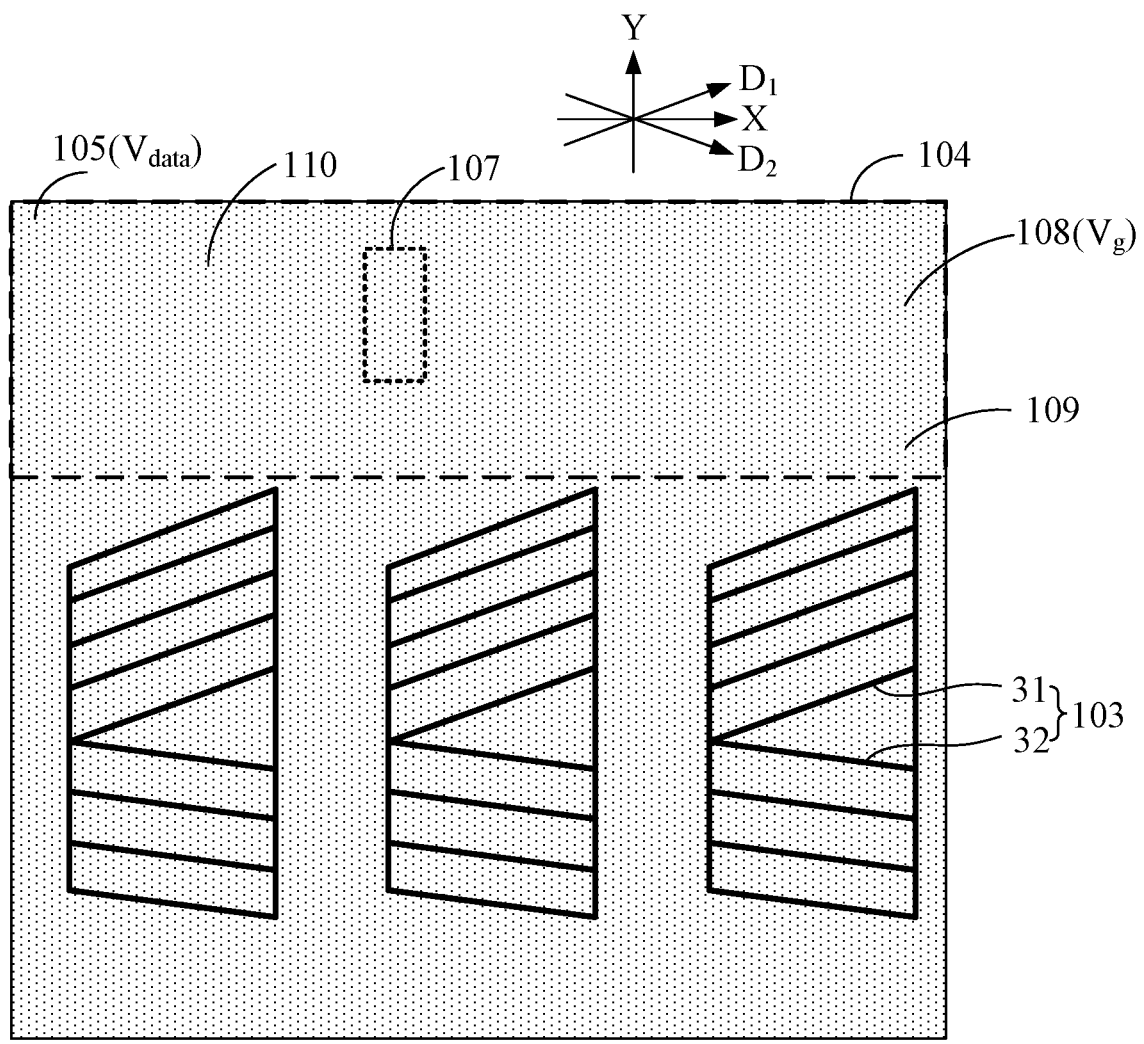
FIG. 19 is another schematic structural diagram of a display substrate provided by an embodiment of the present disclosure.
Figure 20:
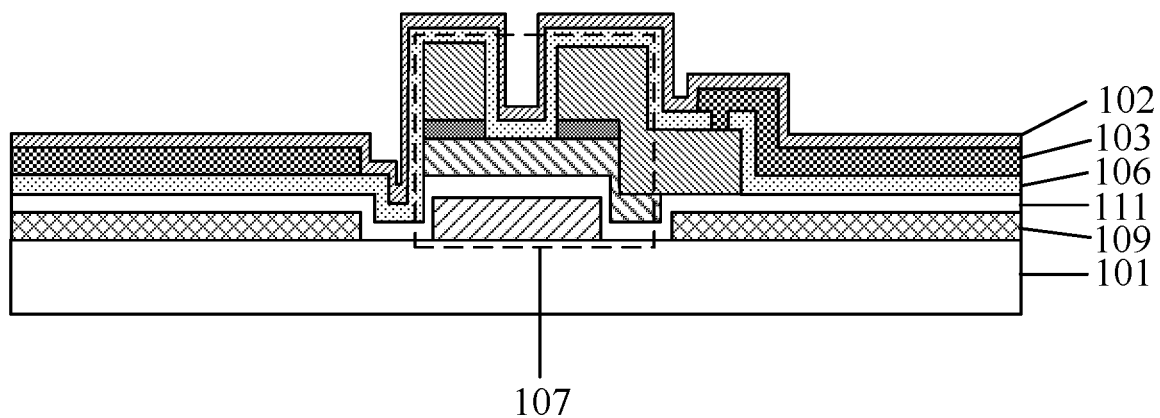
FIG. 20 is another schematic structural diagram of a display substrate provided by an embodiment of the present disclosure.

In some embodiments, in the above display substrate provided by the embodiments of the present disclosure, as shown in FIG. 19 and FIG. 20, the insulating layer 106 may be located between the layer where the first electrode 103 is located and the second electrode 109. The first electrode 103 shields a part of the insulating layer 106, and the insulating layer 106 not be shielded by the first electrode 103 is reused as the pattern layer 104, so that the extra pattern layer 104 is not need to be manufactured. That is, according to the scheme, patterns with the same layer and the same material as the first electrode 103 may not be arranged by adjusting the insulating layer. In this case, the film of the insulating layer 106 may be subjected to process optimization, so that the film of the insulating layer 106 is more compact, the roughness is reduced, and the contact angle is increased, thus the insulating layer may be reused as the pattern layer 104. The film of the insulating layer 106 may be changed by adjusting a ratio value of reaction source gas manufacturing the insulating layer 106. In some embodiments, ammonia gas ($NH_3$) and silane ($SiH_4$) may be used as the reaction source gas. Under the condition that a flow ratio of ammonia gas to silane is greater than or equal to 2 and less than or equal to 8, the contact angle of the manufactured insulating layer 106 may be greater than or equal to 35° and less than 90°. For example, the contact angle of the insulating layer 106 is 37.5°, 52°, 58.7° and the like.

It needs to be explained that the pattern layer 104 may be manufactured separately by adopting the material of the first electrode 103, or the insulating layer 106 may be reused as the pattern layer 104 by separately adjusting the film of the insulating layer 106, or the forgoing two solutions may be combined. That is, on the basis of adopting the insulating layer 106 to reuse as the pattern layer 104, the pattern layer 104 may further be manufactured by adopting the material of the first electrode 103. In addition, it should be understood that under the condition that the morphology of the pattern layer 104 manufactured by adopting the material of the first electrode 103 is the same as the local morphology of the first electrode 103, the inclined strip structure of the pattern layer 104 and the insulating layer 106 at the gap of the inclined strip structure may be used for preventing the alignment layer 102 from accumulation.

In some embodiments, in the above display substrate provided by the embodiments of the present disclosure, as shown in FIG. 21 to FIG. 25, at the intersected position of the first signal line 105 and the second signal line 108. the line width of the first signal line 105 and the line width of the second signal line 108 both become small. In this way, an opposite area of the first signal line 105 and the second signal line 108 may be reduced, so that the parasitic capacitance between the first signal line 105 and the second signal line 108 is ensured to be smaller. Alternatively, the width of one of the first signal line 105 and the second signal line 108 becomes small.

Figure 23:
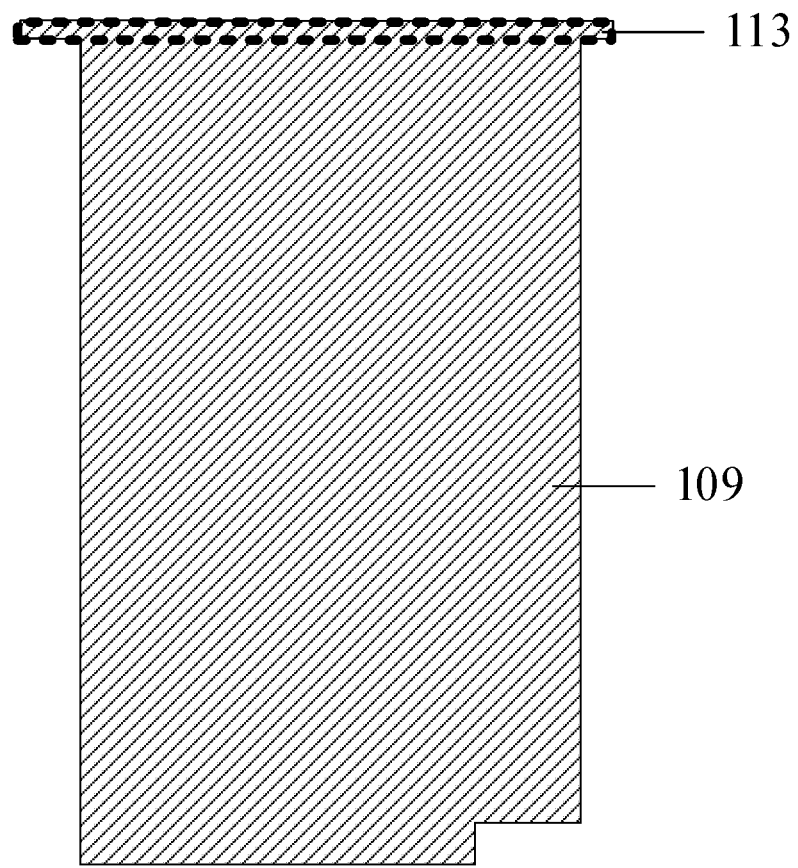
FIG. 23 is a schematic structural diagram of a third signal line and a second electrode in FIG. 21.
Figure 24:
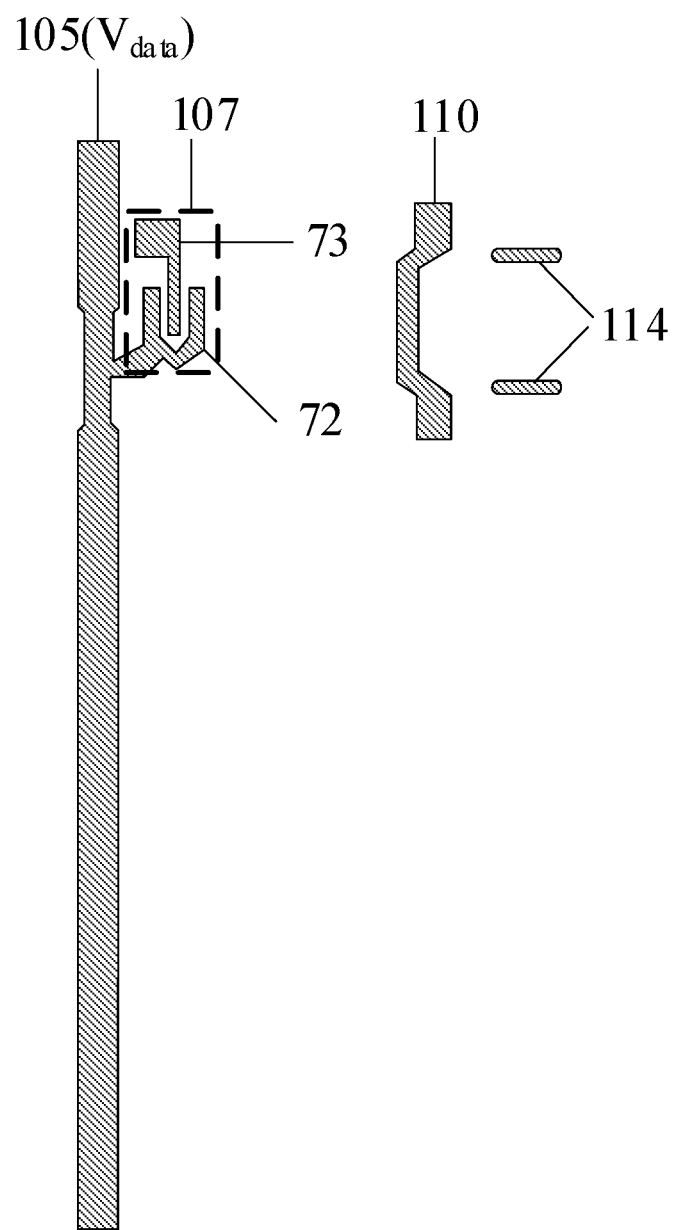
FIG. 24 is a schematic structural diagram of a first signal line, a first pole and a second pole of a transistor, a connection electrode and a limiting structure in FIG. 21.
Figure 26:
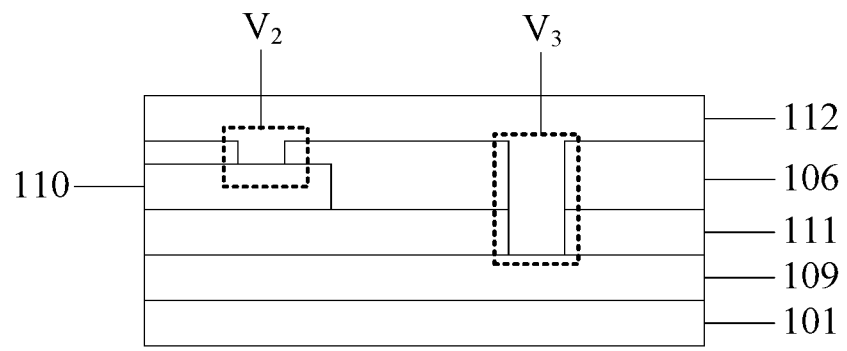
FIG. 26 is a schematic structural diagram of a connection electrode being connected with a second electrode through a first switching electrode.

Continuing to refer to FIG. 21 to FIG. 25, two adjacent second electrodes 109 in the same column are electrically connected through a connection electrode 110, so that the voltage homogeneity and stability of the second electrodes 109 in the same column are better, and the two adjacent rows of second electrodes 109 are electrically connected. Optionally, as shown in FIG. 24, the connection electrode 110 and the first pole 72 and the second pole 73 of the transistor 107 are arranged at the same layer and made of the same material. As shown in FIG. 3, there is a gate insulating layer 111 between the second electrodes 109 and the first pole 72 and the second pole 73 of the transistor 107. Therefore, the connection electrode 110 may be electrically connected with the second electrodes 109 through a punching mode in the gate insulating layer 111. In the related art, the gate insulating layer 111 is manufactured by adopting an open mask, and a composition process is not needed. If punching is carried out in the gate insulating layer 111 to connect the connection electrode 110 and the second electrode 109, a composition process needs to be added. It is considered that the first electrode 103 is electrically connected with the second pole 73 of the transistor 107 through a first via hole $V_1$ penetrating through the insulating layer 106, and there are the insulating layer 106 and the gate insulating layer 111 between the second electrode 109 and the first electrode 103, thus the connection electrode 110 may be electrically connected with the second electrodes 109 through a first switching electrode 112 at the same layer and with the same material as the second electrode 109 and mutually insulated with the second electrode 109. As shown in FIG. 3 and FIG. 26, in the process of forming the first via hole $V_1$ for connecting the first electrode 103 and the second pole 73 of the transistor 107, a second via hole $V_2$ penetrating through the insulating layer 106 and used for realizing electric connection between the connection electrode 110 and the first switching electrode 112, and a third via hole $V_3$ penetrating through the insulating layer 106 and the gate insulating layer 111 and used for realizing electric connection between the second electrode 109 and the first switching electrode 112 may be simultaneously formed. In this way, the composition process of the gate insulating layer 111 is prevented from being additionally added.

Figure 30:
FIG. 30 is a schematic structural diagram of a second signal line, a gate of a transistor and a third signal line in FIG. 27.
Figure 30:
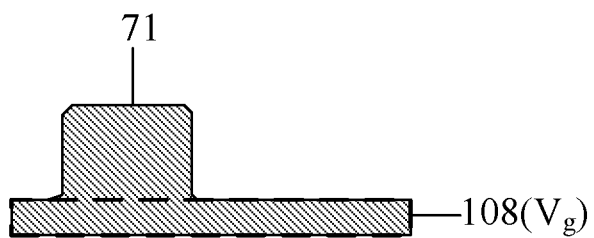
Figure 31:
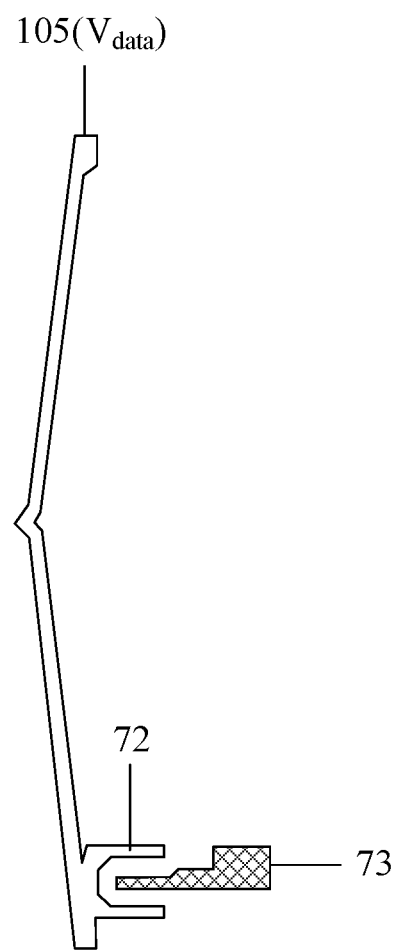
FIG. 31 is a schematic structural diagram of a first signal line, and a first pole and a second pole of a transistor in FIG. 27.

In some embodiments, as shown in FIG. 23, FIG. 27, FIG. 30 and FIG. 32, two adjacent second electrodes 109 in the same row may be electrically connected through the third signal line 113. In FIG. 23, the third signal line 113 and the second electrode 109 in the same row are integrally arranged. In FIG. 27, FIG. 30 and FIG. 32, the third signal line 113 and the second signal line 108 are arranged at the same layer and made of the same material. The two adjacent second electrodes 109 in the same row are electrically connected through the third signal line 113, thus the voltage homogeneity and stability of the second electrodes 109 in the same row are better. It can be known by combining with the above, in some embodiments, the second electrodes 109 in the same column may be connected together through the connection electrode 110. In this case, the second electrodes 109 of each row and each column constitute a whole electrically-connected entirety, and thus it may be ensured that all the second electrodes 109 have the excellent voltage homogeneity and stability. Optionally, at the intersected position of the first signal line 105 and the third signal line 113, the line width of the first signal line 105 and the line width of the third signal line 113 both become smaller. In this way, the opposite area of the first signal line 105 and the third signal line 113 may be reduced, and thus the parasitic capacitance between the first signal line 105 and the third signal line 113 is ensured to be small.

In some embodiments, as shown in FIG. 24, two positioning structures 114 are further arranged in the layer where the first pole 72 and the second pole 73 of the transistor 107 are located. The two positioning structures 114 are used for positioning the position of the spacer (PS). Exemplarily, the orthographic projection of the spacer (PS) on the display substrate is located at the middle position between the two positioning structures 114. In addition, it can be seen from FIG. 25, the first electrodes 103 are slit electrodes, and the pattern between two adjacent slits may be the first strip electrode 31 or the second strip electrode 32.

Figure 21:
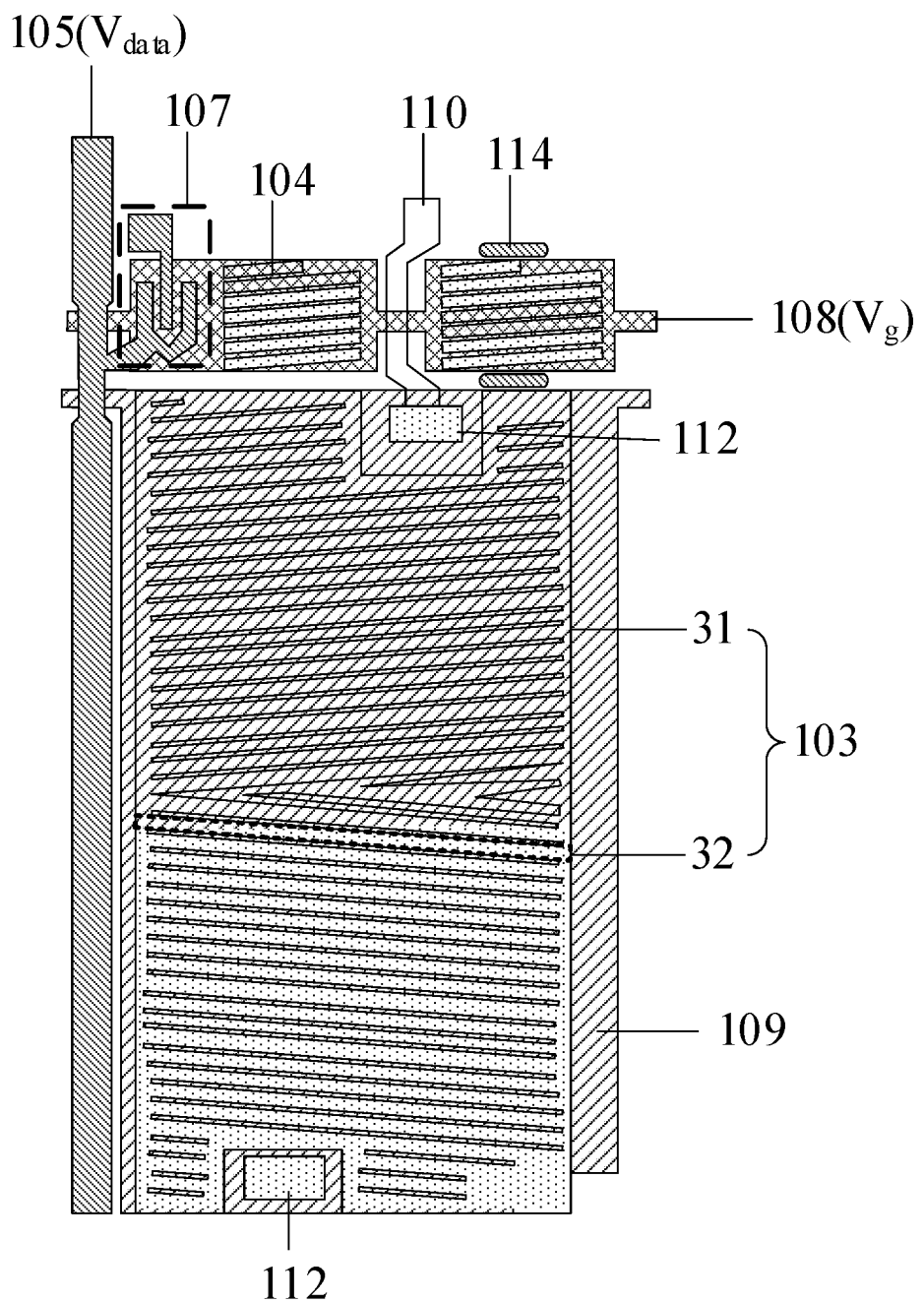
FIG. 21 is a pixel schematic structural diagram of a display substrate provided by an embodiment of the present disclosure.
Figure 22:
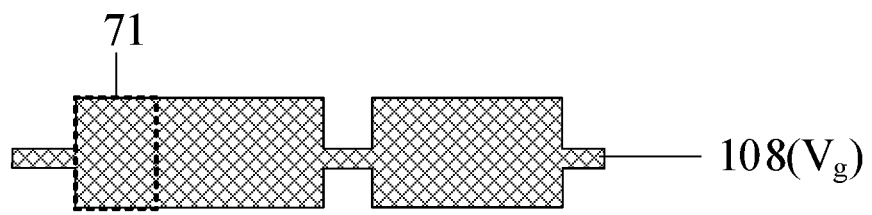
FIG. 22 is a schematic structural diagram of a second signal line and a gate of a transistor in FIG. 21.

In some embodiments, as shown in FIG. 21 and FIG. 24, the first signal 105 may be a straight line extending along the column gap of the first electrodes 103. Alternatively, as shown in FIG. 27, FIG. 31 to FIG. 33, FIG. 35 and FIG. 36, the extension direction and shape of the first signal 105 may be the same as the extension direction and shape of the strip electrode of the first electrode 103 or the second electrode 109, which is not limited here. In addition, as shown in FIG. 27, FIG. 29, FIG. 31 and FIG. 32, a second switching electrode 115 arranged at the same layer and made of the same material as the second electrode 109 may further be included, so that electric connection between the second pole 73 of the transistor 107 and the first electrode 103 is realized through the second switching electrode 115.

In some embodiments, the transistor 107 provided by the embodiments of the present disclosure may be a top gate transistor or a bottom gate transistor. The transistor 107 may be an oxide transistor, an amorphous silicon transistor, and a polycrystalline silicon transistor. The transistor 107 may be a P-type transistor or an N-type transistor. The P-type transistor is conductive when a voltage difference $V_{gs}$ between a gate and a source and a threshold voltage $V_{th}$ meet a relationship $V_{gs}<V_{th}$. The P-type transistor is cut off when the voltage difference $V_{gs}$ between the gate and the source and the threshold voltage $V_{th}$ meet a relationship $V_{gs} \geq V_{th}$. The N-type transistor is conductive when a voltage difference $V_{gs}$ between a gate and a source and a threshold voltage $V_{th}$ meet a relationship $V_{gs} > V_{th}$. The N-type transistor is cut off when the voltage difference $V_{gs}$ between the gate and the source and the threshold voltage $V_{th}$ meet a relationship $V_{gs} \leq V_{th}$. In addition, as shown in FIG. 3, the transistor 107 may further include an active layer 74, and there is a contact layer 75 between the active layer 74 and the first pole 72 and between the active layer 74 and the second pole 73, so as to improve an electric connection effect between the active layer 74 and the first pole 72 and between the active layer 74 and the second pole 73.

Figure 37:
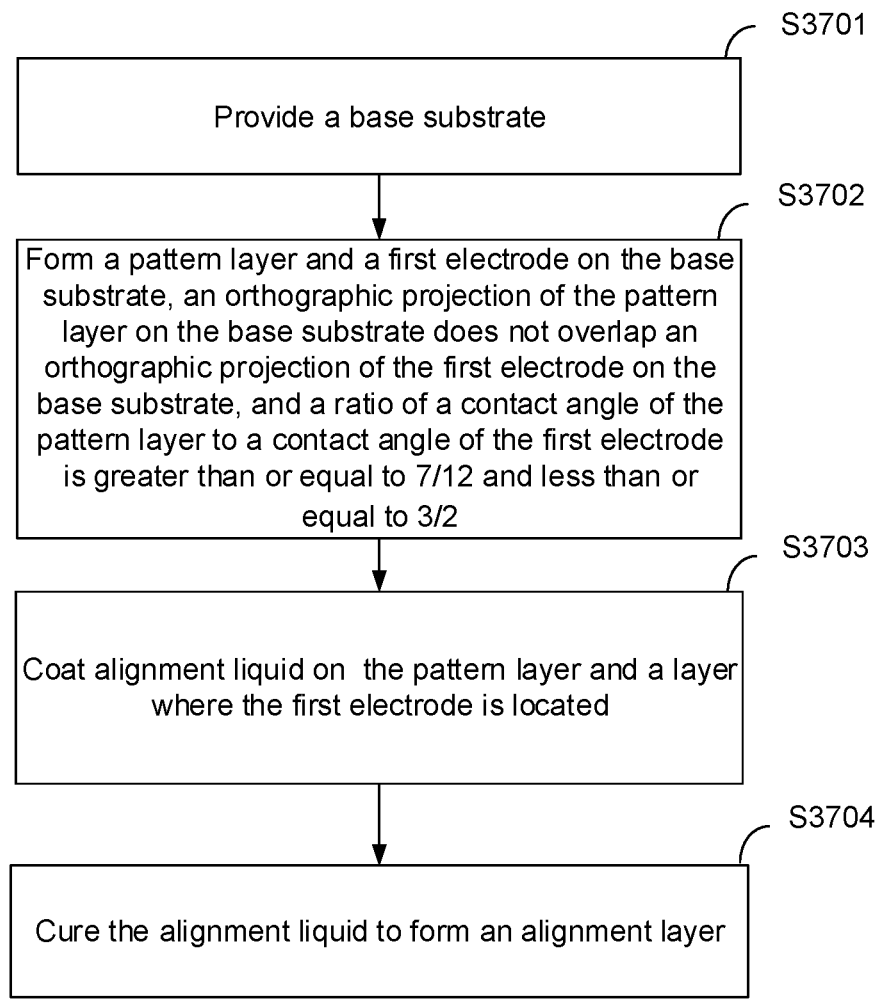
FIG. 37 is a manufacturing flow chart of a display substrate provided by an embodiment of the present disclosure.

Based on the same inventive concept, embodiments of the present disclosure provide a manufacturing method of the above display substrate, as shown in FIG. 37, the manufacturing method may include the following steps.

S3701, a base substrate 101 is provided.

S3702, a pattern layer 104 and a first electrode 103 are formed on the base substrate 101. An orthographic projection of the pattern layer 104 on the base substrate 101 does not overlap an orthographic projection of the first electrode 103 on the base substrate 101. A ratio of a contact angle of the pattern layer 104 to a contact angle of the first electrode 103 is greater than or equal to 7/12 and less than or equal to 3/2.

S3703, alignment liquid is coated on the pattern layer 104 and a layer where the first electrode 103 is located.

S3704, the alignment liquid is cured to form an alignment layer 102.

In some embodiments, in the above manufacturing method provided by the embodiments of the present disclosure, in the above step S3702, the forming the pattern layer and the first electrode on the base substrate may be implemented through two modes: first, the pattern layer and the first electrode which are arranged at the same layer and made of the same material are formed on the base substrate by adopting the same mask; and second, the pattern layer and the first electrode are respectively formed on the base substrate by adopting two masks, and the pattern layer and the first electrode are located at the same layer and materials of the pattern layer and materials of the first electrode are the same.

In some embodiments, in the above manufacturing method provided by the embodiments of the present disclosure, the forming the pattern layer 104 and the first electrode 103 which are arranged at the same layer and made of the same material on the base substrate 101 by adopting the same mask may be implemented through the two following possible modes.

The first possible mode may include the following steps.

Step one, a conducting layer and a photoresist layer are successively formed on the base substrate 101.

Step two, a mask is provided, and the mask only has a pattern for manufacturing the first electrode 103.

Step three, the pattern of the mask is skewed relative to a region where the first electrode is to be manufactured, so that the pattern of the mask can overlaps with the region where the first electrode 103 is to be manufactured and a region where the pattern layer 104 is to be manufactured.

Step four, under shielding of the mask, the photoresist layer of the region where the first electrode 103 is to be manufactured and the photoresist layer of the region where the pattern layer 104 is to be manufactured are exposed in different time.

Optionally, only the photoresist layer of the region where the first electrode 103 is to be manufactured or only the region where the pattern layer 104 is to be manufactured is irradiated by controlling a light source, so that the photoresist layer of the region where the first electrode 103 is to be manufactured and the photoresist layer of the region where the pattern layer 104 is to be manufactured are exposed in different time. Alternatively, under the condition of irradiating the whole mask by the light source, the region where the first electrode 103 is to be manufactured and the region where the pattern layer 104 is to be manufactured are exposed in different time by shielding the photoresist layer of the region where the pattern layer 104 is to be manufactured or the photoresist layer of the region where the first electrode 103 is to be manufactured.

Step five, the photoresist layer is developed to retain the photoresist layer of the region where the first electrode 103 is to be manufactured and the photoresist layer of the region where the pattern layer 104 is to be manufactured.

Step six, under shielding of the photoresist layer, the conducting layer is etched to form the pattern layer 104 and the first electrode 103 which are arranged at the same layer, made of the same material and are disconnected.

The second possible mode may include the following steps.

Step one, a conducting layer and a photoresist layer are successively formed on a base substrate 101.

Step two, a mask is provided, the mask has a first pattern for manufacturing a first electrode 103 and a second pattern for manufacturing a pattern layer 104, and the first pattern and the second pattern are disconnected.

Step three, under shielding of the mask, the photoresist layer of a region where the first electrode 103 is to be manufactured and the photoresist layer of a region where the pattern layer 104 is to be manufactured simultaneously exposed.

Step four, the photoresist layer is developed to retain the photoresist layer of the region where the first electrode 103 is to be manufactured and the photoresist layer of the region where the pattern layer 104 is to be manufactured.

Step five, under shielding of the photoresist layer, the conducting layer is etched to form the pattern layer 104 and the first electrode 103 which are arranged at the same layer, made of the same material and are disconnected.

Optionally, in the above two possible modes, after the pattern layer 104 and the first electrode 103 which are arranged at the same layer, made of the same material and are disconnected are formed, the step of stripping the photoresist layer may further be executed.

In some embodiments, in the above manufacturing method provided by the embodiments of the present disclosure, in the above step S3702, the forming the pattern layer 104 and the first electrode 103 on the base substrate may further be implemented through the following modes.

Ammonia gas and silane are used as reaction source gas to form an integrally-arranged insulating layer 106, and a flow ratio of ammonia gas to silane is greater than or equal to 2 and less than or equal to 8. For example, the flow ratio of ammonia gas to silane may be 2, 2.5, 3, 3.5, 4, 4.5, 5, 5.5, 6, 6.5, 7, 7.5, 8 and the like.

The first electrode 103 is formed on the insulating layer 106 in a pixel open region on the base substrate 101, and the insulating layer 106 outside the pixel open region is reused as the pattern layer 104.

Optionally, after a base substrate 101 is provided, and before the insulating layer 106 which is arranged in a whole surface is formed taking ammonia gas and silane as the reaction source gas, the gate 71 of the transistor 107, the second electrode 109, the gate insulating layer 111, the active layer 74 of the transistor 107, the first pole 72 and the second pole 73 of the transistor, and the connection electrode 110 are formed on the base substrate 101 in sequence. The first pole and the second pole of the transistor and the connection electrode are arranged at the same layer. After the insulating layer 106 which is arranged in a whole surface is formed taking ammonia gas and silane as the reaction source gas, and before the first electrode is formed on the insulating layer 106 in the pixel open region, the first via hole $V_1$, and the second via hole $V_2$ penetrating through the insulating layer 106, and the third via hole $V_3$ penetrating through the insulating layer 106 and the gate insulating layer 111 may further be formed simultaneously. The first via hole $V_1$ is used for implementing electric connection between the second pole 73 of the transistor 107 and the first electrode 103, the second via hole $V_2$ is used for implementing electric connection between the connection electrode 110 and the switching electrode 112, and the third via hole $V_3$ is used for implementing electric connection between the switching electrode 112 and the second electrode 109. In some embodiments, the switching electrode 112 may be manufactured while the first electrode 103 is formed.

It needs to be explained that in the above manufacturing method provided by the embodiments of the present disclosure, the involved composition process forming each layer of structure not only may include part or all processes of deposition, photoresist coating, mask masking, exposure, developing, etching, photoresist stripping and the like, but also may include other processes, the details are subjected to the patterns that need to be formed by the composition process in the actual manufacturing process, which is not limited here. For example, a postbaking process may further be included after developing and before etching. The deposition process may be chemical vapor deposition, plasma enhanced chemical vapor deposition or physical vapor deposition, which is not limited here. The mask used in the masking process may be a half tone mask, a single slit mask or a gray tone mask, which is not limited here. Etching may be dry etching or wet etching, which is not limited here.

Based on the same inventive concept, embodiments of the present disclosure provide a display apparatus, including the above display substrate provided by the embodiments of the present disclosure. Since a principle for solving the problems of the display apparatus is similar to a principle for solving the problems of the above display substrate, the implementation of the display apparatus provided by the embodiments of the present disclosure may refer to the implementation of the above display substrate provided by the embodiments of the present disclosure, repetition is omitted.

In some embodiments, the above display apparatus provided by the embodiments of the present disclosure may be applied to a mobile phone, a tablet personal computer, a television, a display, a notebook computer, a digital photo frame, a navigator, an intelligent watch, a fitness bracelet, a personal digital assistant and any products or components with a display function. Optionally, the above display apparatus provided by the embodiments of the present disclosure is a liquid crystal display. The liquid crystal display may include a backlight module, and a display panel located on a light extraction side of the backlight module. The display panel includes a display substrate and an opposite substrate which are oppositely arranged, a liquid crystal layer located between the display substrate and the opposite substrate, a sealant surrounding the liquid crystal layer between the display substrate and the opposite substrate, a first alignment layer located on a side, close to the liquid crystal layer, of the display substrate, a second alignment layer located on a side, close to the liquid crystal layer, of the opposite substrate, a first polarizer located on a side, away from the liquid crystal layer, of the display substrate, and a second polarizer located on a side, away from the liquid crystal layer, of the opposite substrate. The backlight module may be a direct type backlight module, and may further be a side entry backlight module. The backlight module may include a light source, stacked reflector plates, a light guide plate, a diffusion plate, a prism set and the like. The light source may be a light-emitting diode, such as a mini LED or a micro LED.

Micro LEDs on the submillimeter or even micron scale are self-luminous devices like organic light-emitting diodes (OLED), and has a series of advantages of high brightness, ultra-low delay and oversized visual angle like the organic light-emitting diodes. The inorganic light-emitting diodes emit light based on metal semiconductors with more stable property and lower resistance, and have the advantages of lower power consumption, more high temperature resistance and low temperature resistance and longer service life compared with organic light-emitting diodes emit light based on organic matters. When the Micro LEDs are as a backlight source, a more precise dynamic backlight effect may be implemented, the screen brightness and contrast ratio are effectively improved, meanwhile, a glare phenomenon caused by traditional dynamic backlight between screen bright and dark regions may further be solved, and the visual sense experience is optimized.

In some embodiments, the above display apparatus provided by the embodiments of the present disclosure may include but is not limited to: a radio frequency unit, a network module, an audio output & input unit, a sensor, a display unit, a user input unit, an interface unit, a control chip and other components. Optionally, the control chip is a central processing unit, a digital signal processor, a system chip (SoC) and the like. For example, the control chip may further include a memory, may further include a power module and the like, and implements power supply and signal input and output functions through a wire and a signal line which are additionally arranged. For example, the control chip may further include a hardware circuit and computer executable codes. The hardware circuit may include a conventional very-large-scale integration (VLSI) circuit or a gate array and existing semiconductors such as a logic chip and a transistor and other discrete elements; and the hardware circuit may further include a field programmable gate array, a programmable array logic, a programmable logic device and the like.

In addition, those skilled in the art should understand that the above structure does not constitute the limitation of the above display apparatus provided by the embodiment of the present disclosure, in other words, the above display apparatus provided by the embodiment of the present disclosure may include the above more or less components, or a combination of some components, or different components.

Although the preferred embodiments of the present disclosure are described, it should be understood that those skilled in the art may make various modifications and variations to these embodiments without deviating from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A display substrate, comprising:
   a base substrate;
   an alignment layer on the base substrate;
   a first electrode, located between the base substrate and the alignment layer and being in contact with the alignment layer; and
   a pattern layer, located between the base substrate and the alignment layer and being in contact with the alignment layer;
   wherein an orthographic projection of the pattern layer on the base substrate does not overlap an orthographic projection of the first electrode on the base substrate, and a ratio of a contact angle of the pattern layer to a contact angle of the first electrode is greater than or equal to 7/12 and less than 3/2;
   wherein the pattern layer and the first electrode are arranged at a same layer and made of a same material;
   there are a plurality of first electrodes, and the plurality of first electrodes are arranged in an array on the base substrate; the orthographic projection of the pattern layer on the base substrate is located in an orthographic projection of a row gap of the first electrodes on the base substrate;
   the first electrode comprises a first strip electrode and a second strip electrode which are integrally arranged;
   wherein an extension direction of the first strip electrode is intersected with a row direction, a column direction and an extension direction of the second strip electrode, and the extension direction of the second strip electrode is intersected with the row direction and the column direction; and
   the pattern layer extends in the extension direction of the first strip electrode and/or the extension direction of the second strip electrode.

2. The display substrate according to claim 1, wherein when the pattern layer extends in the extension direction of the first strip electrode and the extension direction of the second strip electrode, extension directions of the pattern layer at two adjacent row gaps of the first electrodes are different.

3. The display substrate according to claim 1, wherein:
a line width of the pattern layer is same as:
a line width of the first strip electrode which extends in a same direction as the pattern layer; and/or
a line width of the second strip electrode which extends in a same direction as the pattern layer; and
a line distance of the pattern layer is same as:
a line distance of the first strip electrode which extends in a same direction as the pattern layer; and/or
a line distance of the second strip electrode which extends in a same direction as the pattern layer.

4. The display substrate according to claim 1, wherein the pattern layer comprises:
a plurality of block patterns arranged at intervals at the same row gap of the first electrodes;
wherein the block pattern extends in the row direction; or
strip patterns extending in the row direction at the row gap of the first electrodes;
wherein a length of the strip pattern in the row direction is same as a length of the row gap.

5. The display substrate according to claim 1, further comprising:
a first signal line;
wherein an orthographic projection of the first signal line on the base substrate is located in an orthographic projection of a column gap of the first electrodes on the base substrate; and
the orthographic projection of the pattern layer on the base substrate does not overlap the orthographic projection of the first signal line on the base substrate.

6. The display substrate according to claim 5, further comprising:
a transistor;
wherein at least part of the first signal line is electrically connected with the transistor; and
the orthographic projection of the pattern layer on the base substrate does not overlap an orthographic projection of the transistor on the base substrate.

7. The display substrate according to claim 1, further comprising:
a second signal line;
wherein an orthographic projection of the second signal line on the base substrate is located in the orthographic projection of the row gap of the first electrodes on the base substrate; and
the orthographic projection of the pattern layer on the base substrate is located in the orthographic projection of the second signal line on the base substrate.

8. The display substrate according to claim 7, wherein a ratio of a width of the pattern layer in the column direction to a width of the second signal line in the column direction is greater than or equal to ⅗ and less than 1.

9. The display substrate according to claim 1, further comprising:
a second signal line;
wherein an orthographic projection of the second signal line on the base substrate is located in the orthographic projection of the row gap of the first electrodes on the base substrate, and there are two second signal lines arranged at the same row gap; and
at the same row gap of the first electrodes, the orthographic projections of the two second signal lines on the base substrate are located in the orthographic projection of the pattern layer on the base substrate.

10. The display substrate according to claim 1, further comprising:
a first signal line and a second signal line which are intersected and mutually insulated;
wherein an orthographic projection of the first signal line on the base substrate is located in an orthographic projection of a column gap of the first electrodes on the base substrate, an orthographic projection of the second signal line on the base substrate is located in the orthographic projection of the row gap of the first electrodes on the base substrate, and there are two second signal lines arranged at the same row gap; and
the first signal line comprises:
an island structure at an intersected position of the column gap of the first electrodes and a gap of the two second signal lines; and
the orthographic projection of the pattern layer on the base substrate is coincided with an orthographic projection of the island structure on the base substrate.

11. The display substrate according to claim 1, further comprising:
a second signal line, and
a gate,
wherein the second signal line and the gate are of an integral structure and the gate protrudes relative to the second signal line; and
the pattern layer comprises:
a plurality of first partitions intersected with a row direction and a column direction; and
a second partition extending in the row direction;
wherein an orthographic projection of the first partitions on the base substrate is located in an orthographic projection of the gate on the base substrate, and an orthographic projection of the second partition on the base substrate is located in an orthographic projection of the second signal line on the base substrate.

12. The display substrate according to claim 1, further comprising:
a second electrode located between a layer where the first electrode is located and the base substrate; wherein the orthographic projection of the first electrode on the base substrate overlaps with an orthographic projection of the second electrode on the base substrate; and/or
an insulating layer between a layer where the first electrode is located and a layer where the second electrode is located; wherein the first electrode shields a part of the insulating layer, and the insulating layer not shielded by the first electrode is reused as the pattern layer.

13. The display substrate according to claim 1, wherein the alignment layer comprises:
a positioning region for arranging a spacer;
wherein an orthographic projection of the positioning region on the base substrate is located in the orthographic projection of the pattern layer on the base substrate.

14. A manufacturing method of the display substrate according to claim 1, comprising:
providing the base substrate;
forming the pattern layer and the first electrode on the base substrate, wherein the orthographic projection of the pattern layer on the base substrate does not overlap the orthographic projection of the first electrode on the base substrate, and the ratio of the contact angle of the pattern layer to the contact angle of the first electrode is greater than or equal to 7/12 and less than or equal to 3/2;

coating alignment liquid on the pattern layer and a layer where the first electrode is located; and curing the alignment liquid to form the alignment layer.

15. The manufacturing method according to claim 14, wherein said forming the pattern layer and the first electrode on the base substrate comprises:

forming the pattern layer and the first electrode which are arranged in a same layer and made of a same material on the base substrate by adopting a same mask; or forming an insulating layer which is arranged on a whole surface taking ammonia gas and silane as reaction source gas, wherein a flow ratio of the ammonia gas to the silane is greater than or equal to 2 and less than or equal to 8; and forming the first electrode on the insulating layer in a pixel opening region of the base substrate, wherein the insulating layer outside the pixel opening region is reused as the pattern layer.

16. The manufacturing method according to claim 15, wherein said forming the pattern layer and the first electrode which are arranged in the same layer and made of the same material on the base substrate by adopting the same mask comprises:

forming a conducting layer and a photoresist layer successively on the base substrate;

providing a mask, wherein the mask only has a pattern for manufacturing the first electrode;

skewing the pattern of the mask relative to a region where the first electrode is to be manufactured, so that the pattern of the mask overlaps the region where the first electrode is to be manufactured and a region where the pattern layer is to be manufactured;

exposing, under shielding of the mask, the photoresist layer of the region where the first electrode is to be manufactured and the photoresist layer of the region where the pattern layer is to be manufactured in different time;

developing the photoresist layer to retain the photoresist layer of the region where the first electrode is to be manufactured and the photoresist layer of the region where the pattern layer is to be manufactured; and etching, under shielding of the photoresist layer, the conducting layer to form the pattern layer and the first electrode which are arranged in the same layer, made of the same material and are disconnected; or forming a conducting layer and a photoresist layer successively on the base substrate;

providing a mask, wherein the mask has a first pattern for manufacturing the first electrode and a second pattern for manufacturing the pattern layer, and the first pattern and the second pattern are disconnected;

exposing, under shielding of the mask, the photoresist layer of the region where the first electrode is to be manufactured and the photoresist layer of the region where the pattern layer is to be manufactured;

developing the photoresist layer to retain the photoresist layer of the region where the first electrode is to be manufactured and the photoresist layer of the region where the pattern layer is to be manufactured; and etching, under shielding of the photoresist layer, the conducting layer to form the pattern layer and the first electrode which are arranged in the same layer, made of the same material and are disconnected.

17. A display apparatus, comprising the display substrate according to claim 1.

* * * * *